(12) United States Patent
Kim et al.

(10) Patent No.: US 10,674,553 B2
(45) Date of Patent: Jun. 2, 2020

(54) METHOD FOR DIRECT COMMUNICATION BETWEEN TERMINALS IN WIRELESS COMMUNICATION SYSTEM AND APPARATUS FOR METHOD

(71) Applicant: LG ELECTRONICS INC., Seoul (KR)

(72) Inventors: Taehun Kim, Seoul (KR); Sunghoon Jung, Seoul (KR); Laeyoung Kim, Seoul (KR); Jaehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/770,083

(22) PCT Filed: Oct. 6, 2016

(86) PCT No.: PCT/KR2016/011172
§ 371 (c)(1),
(2) Date: Apr. 20, 2018

(87) PCT Pub. No.: WO2017/069435
PCT Pub. Date: Apr. 27, 2017

(65) Prior Publication Data
US 2018/0317268 A1    Nov. 1, 2018

Related U.S. Application Data

(60) Provisional application No. 62/244,748, filed on Oct. 22, 2015, provisional application No. 62/253,134, (Continued)

(51) Int. Cl.
*H04W 76/14* (2018.01)
*H04W 76/10* (2018.01)
(Continued)

(52) U.S. Cl.
CPC ........... *H04W 76/14* (2018.02); *H04W 8/005* (2013.01); *H04W 8/24* (2013.01); *H04W 40/04* (2013.01);
(Continued)

(58) Field of Classification Search
CPC ..................................................... H04W 76/14
See application file for complete search history.

(56) References Cited

U.S. PATENT DOCUMENTS 9,820,285 B2* 11/2017 Xue .................... H04W 56/001
10,154,525 B2* 12/2018 Kuo ..................... H04W 76/32
(Continued)

FOREIGN PATENT DOCUMENTS

KR    10-2015-0094325 A    8/2015
WO    2012/091418 A2    7/2012
(Continued)

OTHER PUBLICATIONS

3GPP TR 23.779 V0.4.0, "Study on architectural enhancements to support Mission Critical Push to Talk over LTE (MCPTT) services (Release 13)", Dec. 2, 2014, pp. 20-23.
(Continued)

*Primary Examiner* — Parth Patel
(74) *Attorney, Agent, or Firm* — Dentons US LLP

(57) ABSTRACT

Disclosed are a method and a UE for ProSe communication, the method receiving, from a second UE with which a connection for direct communication with a first UE has not been established, a PC5 discovery message comprising information regarding the second UE resource state, and selecting a relay UE with consideration for the second UE resource state.

4 Claims, 14 Drawing Sheets

| 8 | 7 | 6 | 5 | 4 | 3 | 2 | 1 |
|---|---|---|---|---|---|---|---|
| Discovery type | | | Content Type | | | Discovery model | Octect 1 |

Related U.S. Application Data filed on Nov. 10, 2015, provisional application No. 62/278,936, filed on Jan. 14, 2016.

(51) Int. Cl.

| | | |
|---|---|---|
| *H04W 40/04* | (2009.01) | |
| *H04W 40/24* | (2009.01) | |
| *H04W 8/24* | (2009.01) | |
| *H04W 8/00* | (2009.01) | |
| *H04W 40/22* | (2009.01) | |
| *H04W 88/04* | (2009.01) | |
| *H04B 17/318* | (2015.01) | |

(52) U.S. Cl.
CPC ......... *H04W 40/22* (2013.01); *H04W 40/246* (2013.01); *H04W 76/10* (2018.02); *H04B 17/318* (2015.01); *H04W 88/04* (2013.01)

(56) References Cited

U.S. PATENT DOCUMENTS

| | | | |
|---|---|---|---|
| 10,531,365 B2* | 1/2020 | Kaur | H04W 24/04 |
| 2015/0230180 A1* | 8/2015 | Lim | H04W 52/0235 |
| | | | 370/311 |
| 2016/0037568 A1* | 2/2016 | Hakola | H04W 76/14 |
| | | | 370/329 |
| 2016/0044613 A1* | 2/2016 | Cai | H04W 56/00 |
| | | | 370/315 |
| 2016/0100353 A1* | 4/2016 | Gleixner | H04W 48/16 |
| | | | 370/329 |
| 2016/0150373 A1* | 5/2016 | Kim | H04B 7/026 |
| | | | 455/456.3 |
| 2016/0205532 A1* | 7/2016 | Chen | H04W 4/70 |
| | | | 370/328 |
| 2016/0212682 A1* | 7/2016 | Chung | H04W 76/14 |
| 2016/0212721 A1 | 7/2016 | Sheng et al. | |
| 2016/0269185 A1* | 9/2016 | Stojanovski | H04L 9/3066 |
| 2016/0286471 A1* | 9/2016 | Zisimopoulos | H04W 48/16 |
| 2016/0286590 A1* | 9/2016 | Cheng | H04W 4/90 |
| 2016/0295510 A1* | 10/2016 | Zisimopoulos | H04W 24/02 |
| 2016/0330603 A1* | 11/2016 | Chuang | H04B 7/15507 |
| 2016/0337954 A1* | 11/2016 | Gulati | H04W 76/14 |
| 2016/0344782 A1* | 11/2016 | Cheng | H04W 76/14 |
| 2016/0353307 A1* | 12/2016 | Jung | H04W 8/005 |
| 2016/0360393 A1* | 12/2016 | Wu | H04W 8/005 |
| 2017/0071028 A1* | 3/2017 | Kuo | H04W 76/27 |
| 2017/0078828 A1* | 3/2017 | Watfa | H04W 8/005 |
| 2017/0111754 A1* | 4/2017 | Baghel | H04W 76/14 |
| 2017/0317740 A1* | 11/2017 | Basu Mallick | H04B 7/15557 |
| 2018/0054804 A1* | 2/2018 | Luo | H04W 72/04 |
| 2018/0063768 A1* | 3/2018 | Martin | H04W 36/30 |
| 2018/0091964 A1* | 3/2018 | Adachi | H04W 8/00 |
| 2018/0092017 A1* | 3/2018 | Freda | H04W 76/14 |
| 2018/0152234 A1* | 5/2018 | Huang | H04W 36/06 |
| 2018/0160325 A1* | 6/2018 | Cheng | H04W 76/14 |
| 2018/0220480 A1* | 8/2018 | Agiwal | H04W 24/08 |
| 2018/0242381 A1 | 8/2018 | Wei et al. | |
| 2018/0242393 A1* | 8/2018 | Wei | H04W 88/04 |
| 2018/0255499 A1* | 9/2018 | Loehr | H04B 7/2606 |
| 2018/0255505 A1* | 9/2018 | Thyagarajan | H04W 8/005 |

FOREIGN PATENT DOCUMENTS

| | | |
|---|---|---|
| WO | 2015/020460 A1 | 2/2015 |
| WO | 2015/065132 A1 | 5/2015 |
| WO | 2015/115822 A1 | 8/2015 |
| WO | 2015/115824 A1 | 8/2015 |

OTHER PUBLICATIONS

3GPP TR 23.713 V13.0.0, "Study on extended architecture support for proximity-based services (Release 13)", Sep. 22, 2015, pp. 39-41.
CATT: "Correction of TTL related to the Discovery filter", S2-150297, SA WG2 Meeting #107, Sorrento, Italy, Jan. 26-30, 2015, pp. 1-3.
3GPP TS 23303 V13.1.1, "Proximity-based services (ProSe); Stage 2 (Release 13)", Sep. 30, 2015, pp. 39-41.

* cited by examiner (a) UE-1 and UE-2 camp on different eNode B (b) UE-1 and UE-2 camp on same eNode B

| 8 | 7 | 6 | 5 | 4 | 3 | 2 | 1 | |
|---|---|---|---|---|---|---|---|---|
| Discovery type | | Content Type | | | | Discovery model | | Octect 1 |

METHOD FOR DIRECT COMMUNICATION BETWEEN TERMINALS IN WIRELESS COMMUNICATION SYSTEM AND APPARATUS FOR METHOD

This application is a National Stage Application of International Application No. PCT/KR2016/011172, filed on Oct. 6, 2016, which claims the benefit of U.S. Provisional Application No. 62/244,748, filed on Oct. 22, 2015, U.S. Provisional Application No. 62/253,134, filed on Nov. 10, 2015 and U.S. Provisional Application No. 62/278,936, filed on Jan. 14, 2016, all of which are hereby incorporated by reference in their entirety for all purposes as if fully set forth herein.

TECHNICAL FIELD

Following description relates to a wireless communication system, and more particularly, to a method of transmitting and receiving a discovery message in direct communication (e.g., ProSe communication) between terminals and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Tasks

An object of the present invention is to improve a method of transmitting and receiving a discovery message between terminals in a ProSe communication process.

Another object of the present invention is to enhance signaling overhead of unnecessarily transmitting and receiving a discovery message.

The other object of the present invention is to reduce the waste of a radio resource used for ProSe communication due to transmission/reception of a discovery message.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method for performing proximity service (ProSe) communication, which is performed by a first user equipment (UE) which is a ProSe-enabled UE in a wireless communication system, the method comprises receiving a PC5 discovery message including information on a resource status of a second UE from the second UE with which a connection for direct communication with the first UE is not established, and selecting a relay UE in consideration of the resource status of the second UE.

The information on the resource status may comprise a resource status indicator.

When the resource status of the second UE is not sufficient to support an additional remote UE, the selecting step may comprise determining a relay UE except the second UE.

When the resource status of the second UE is sufficient to supporting an additional remote UE, the selecting step may comprise determining the second UE as the relay UE.

When the second UE communicates with a third UE with which a connection for direct communication is established using a Model A discovery scheme, the PC5 discovery message may be a discovery announcement message.

When the second UE communicates with a third UE with which a connection for direct communication is established using a Model B discovery scheme, the PC5 discovery message may be a discovery response message.

To further achieve these and other advantages and in accordance with the purpose of the present invention, according to a different embodiment, a first user equipment (UE) comprises a transmitting unit, a receiving unit, and a processor configured to operate in a manner of being connected with the transmitting unit and the receiving unit, the processor configured to receive, from the second UE with which a connection for direct communication with the first UE is not established, a PC5 discovery message including information on a resource status of a second UE, and select a relay UE based on the resource status of the second UE.

Advantageous Effects

As is apparent from the above description, the embodiments of the present invention have the following effects.

First of all, it is able to reduce signaling overhead of unnecessarily transmitting and receiving a discovery message in ProSe communication.

Second, since it is able to reduce unnecessary transmission of a discovery message in ProSe communication, it is able to sufficiently secure radio resource for performing ProSe communication.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Mode for Invention

Figure 1:
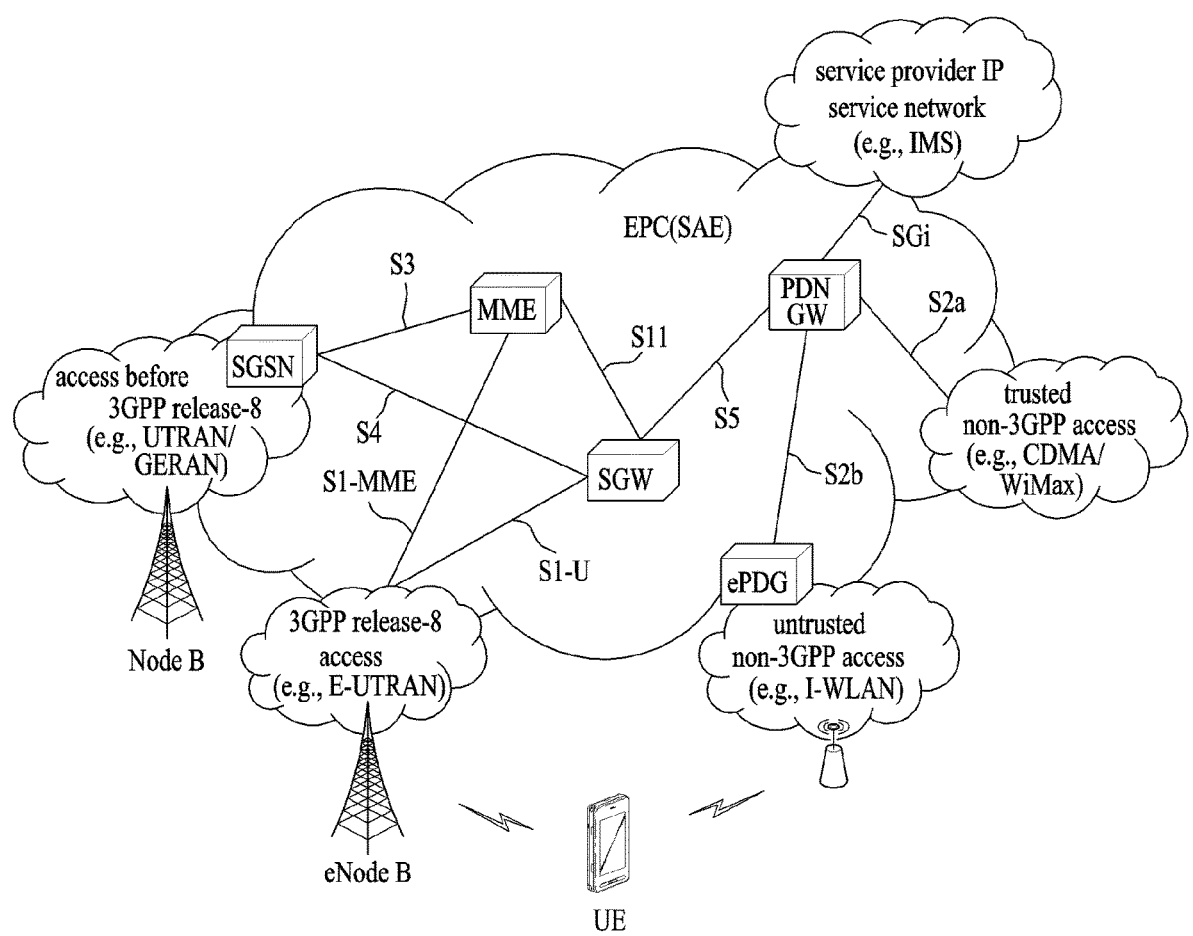
FIG. 1 is a diagram illustrating a brief structure of an EPS (evolved packet system) that includes an EPC (evolved packet core)

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE)/LTE-Advanced (LTE-A) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16e-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

Terms used in the specification are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNode B: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNode B): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW/P-GW: a network node of an EPS network, which performs UE IP address allocation, packet screening and filtering, charging data collection, etc.

SGW (Serving Gateway/S-GW: a network node of an EPS network, which performs mobility anchor, packet routing, idle-mode packet buffering, and triggering of an MME's UE paging.

PCRF (Policy and Charging Rule Function): a network node of an EPS network, which performs a policy decision to dynamically apply different QoS and charging policies for each service flow.

OMA DM (Open Mobile Alliance Device Management): a protocol designed to manage mobile devices such as a cell phone, a PDA, and a laptop computer, which performs functions such as device configuration, firmware upgrade, error report, and the like.

OAM (Operation Administration and Maintenance): a set of network management functions, which provides network error display, performance information, data, and management functions.

NAS (Non-Access Stratum): a higher stratum of a control plane between a UE and MME. As a functional layer for exchanging signaling and traffic messages between a UE and core network in LTE/UMTS protocol stack, the NAS supports UE mobility, a session management procedure for establishing and maintaining an IP connection between a UE and PDN GW, and IP address management.

AS (Access-Stratum): the AS includes a protocol stack between a UE and a radio (or access) network, which manages transmission of data and network control signals.

NAS configuration MO (Management Object): the NAS configuration MO is a management object (MO) used to configure parameters related to NAS functionality for a UE.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

APN (Access Point Name): a character string for indicating or identifying PDN. To access a requested service or network, a connection to a specific P-GW is required. The APN means a name (character string) predefined in a network to search for the corresponding P-GW (for example, it may be defined as internet.mnc012.mcc345.gprs).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

ANDSF (Access Network Discovery and Selection Function): This is one of network entities for providing a policy for discovering and selecting an access that can be used by a UE on an operator basis.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: a ProSe-enabled public safety UE operating as a ProSe communication relay among two or more ProSe-enabled public safety UEs Remote UE: This is a ProSe-enabled Public Safety UE that is connected to an EPC network through a ProSe UE-to-network relay instead of being served by an E-UTRAN in UE-to-Network Relay operation. That is, a PDN connection is provided to the remote UE. A ProSe-enabled Public Safety UE communicating with a different ProSe-enabled public safety UE through a ProSe UE-to-UE relay in UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNode B (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNode B and the PDN GW. When. When a terminal moves over an area served by an eNode B, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNode Bs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNode B path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |

TABLE 1-continued

| Reference point | Description |
|---|---|
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
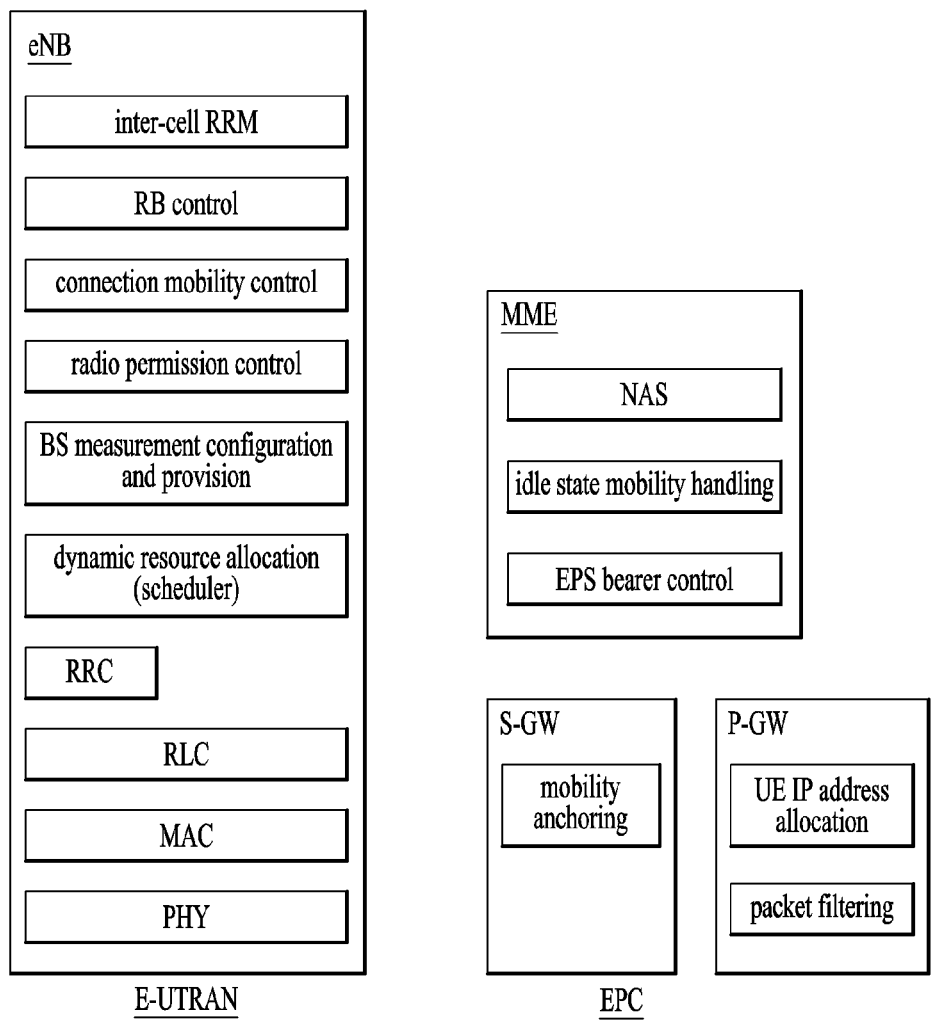
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNode B may perform routing to a gateway, scheduling transmission of a paging message, scheduling and transmission of a broadcast channel (BCH), dynamic allocation of resources to a UE on uplink and downlink, configuration and provision of eNode B measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
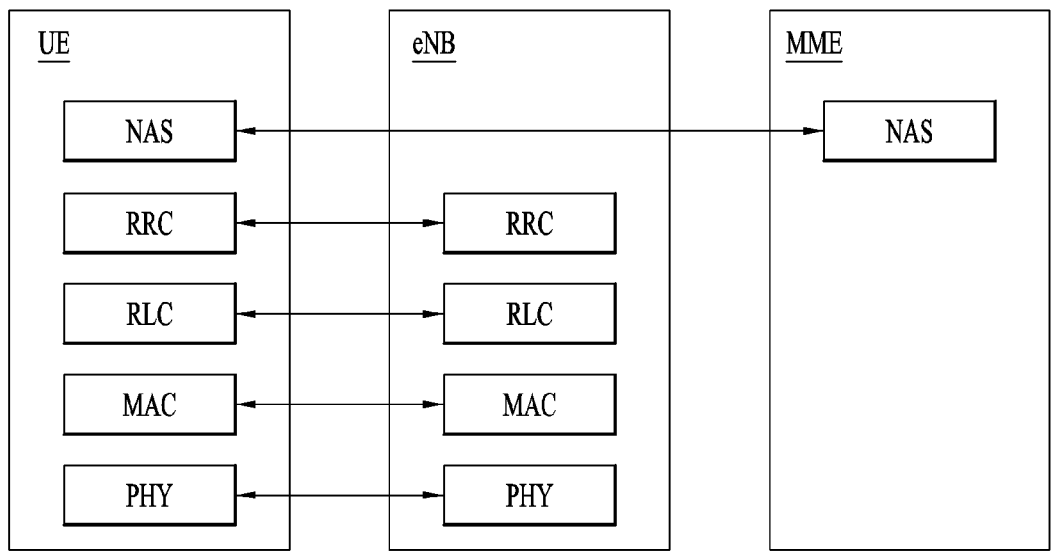
FIG. 3 is an exemplary diagram illustrating a structure of a radio interface protocol on a control plane.
Figure 4:
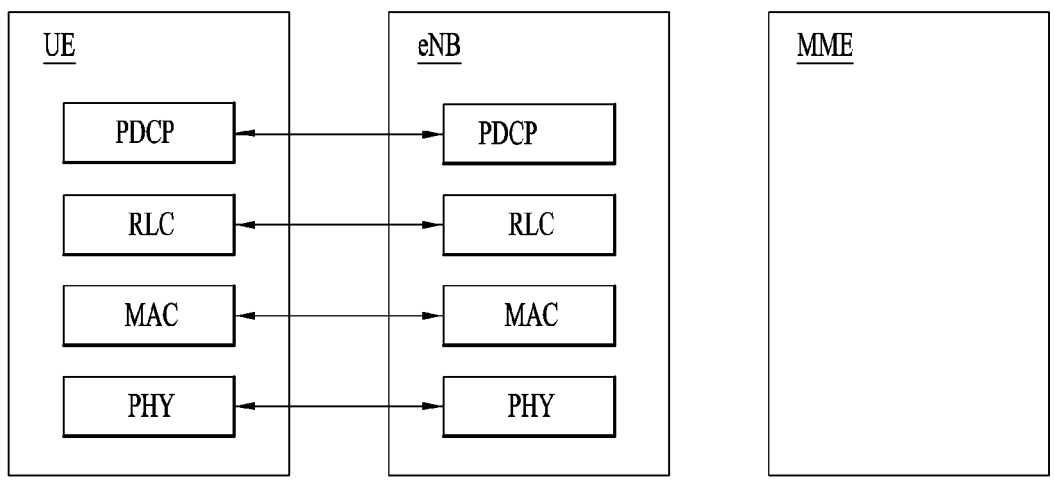
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of OFDM symbols in the time domain and a plurality of subcarriers. One subframe consists of a plurality of resource blocks. One resource block consists of a plurality of OFDM symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CO- NNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
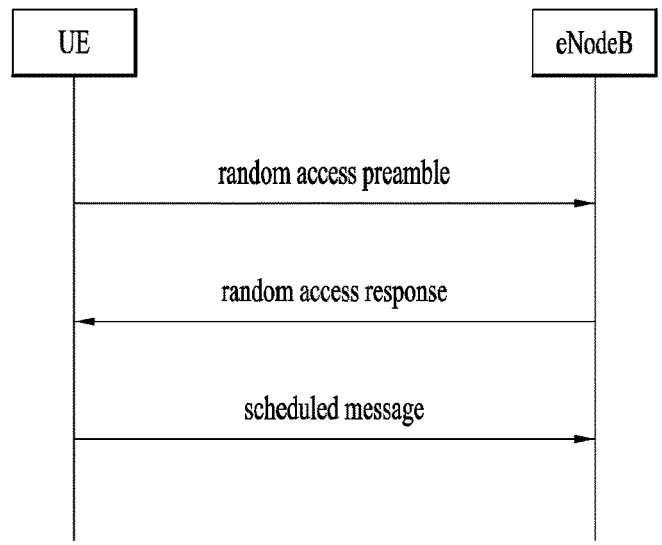
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNode B. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNode B. The UE selects a random access preamble from among 64 candidate random access preambles and the UE selects a subframe corresponding to the PRACH configuration index. The UE transmits the selected random access preamble in the selected subframe.

Upon receiving the random access preamble, the eNode B sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
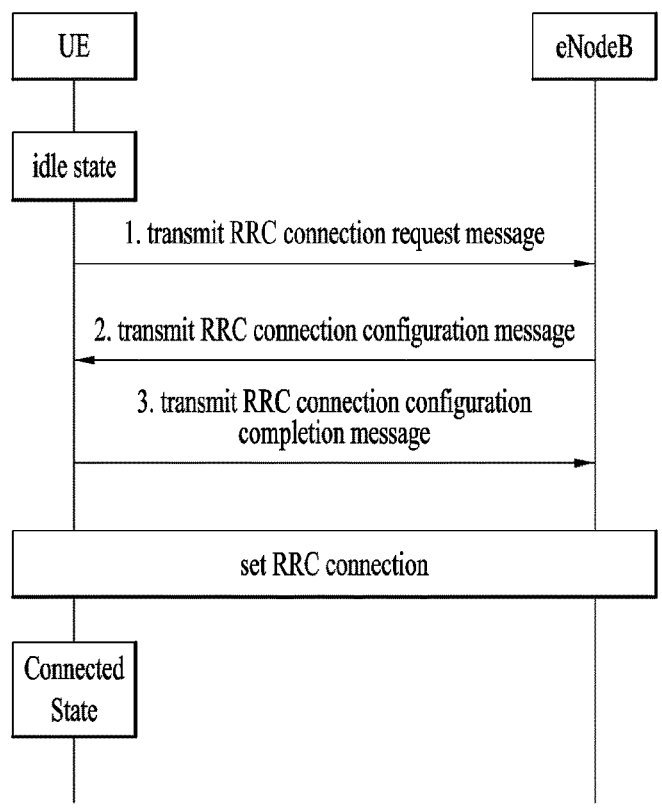
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNode B. An RRC state in which the entity of the RRC layer of the UE is logically connected with the entity of the RRC layer of the eNode B is called an RRC connected state. An RRC state in which the entity of the RRC layer of the UE is not logically connected with the entity of the RRC layer of the eNode B is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNode B through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNode B, the RRC connection procedure needs to be performed as described above. The RRC connection procedure is broadly divided into transmission of an RRC connection request message from the UE to the eNode B, transmission of an RRC connection setup message from the eNode B to the UE, and transmission of an RRC connection setup complete message from the UE to eNode B, which are described in detail below with reference to FIG. 6.

1) When the UE in the idle state desires to establish RRC connection for reasons such as an attempt to make a call, a data transmission attempt, or a response of the eNode B to paging, the UE transmits an RRC connection request message to the eNode B first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNode B. Only when the UE successfully transmits the RRC connection setup message, does the UE establish RRC connection with the eNode B and transition to the RRC connected mode.

2. ProSe Service (Proximity Service)

As described above, ProSe service means a service that enables discovery between physically proximate devices and mutual direct communication, communication through a base station or communication through a third device.

Figure 7:
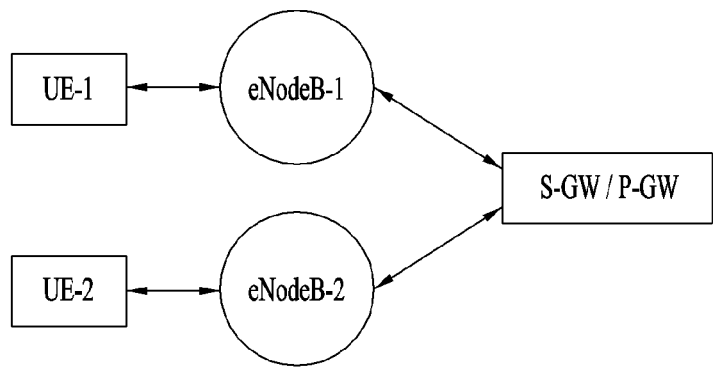
FIG. 7 illustrates a basic path for communication between two UEs in the EPS.

FIG. 7 illustrates a default data path through which two UEs perform communication with each other in an EPS. This default data path passes through an eNode B and a core network (i.e., EPC), which are managed by an operator. In the present invention, this path will be referred to as an infrastructure data path (or EPC path). Also, communication through this infrastructure data path will be referred to as infrastructure communication.

Figure 8:
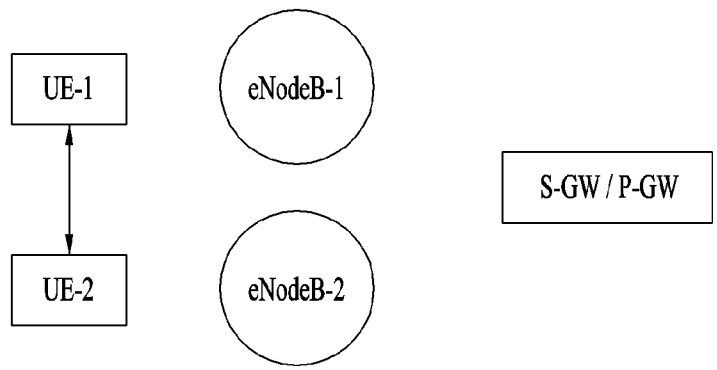
FIG. 8 illustrates a ProSe-based direct-mode communication path between two UEs.
Figure 8:
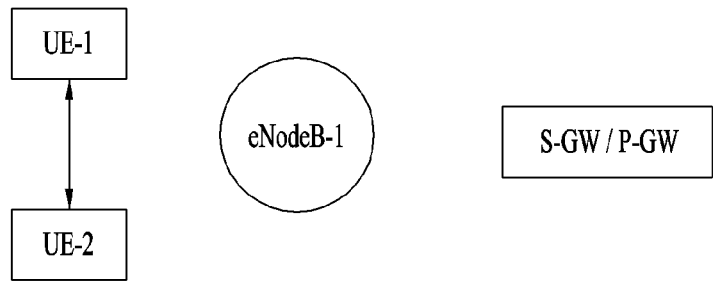

FIG. 8 illustrates a direct mode data path between two UEs based on ProSe. This direct mode communication path does not pass through the eNode B and the core network (i.e., EPC), which are managed by an operator. FIG. 8(a) illustrates a case that UE-1 and UE-2 are camping on different eNode Bs and exchange data through a direct mode communication path. FIG. 8(b) illustrates a case that two UEs are camping on the same eNode B and exchange data through a direct mode communication path.

Figure 9:
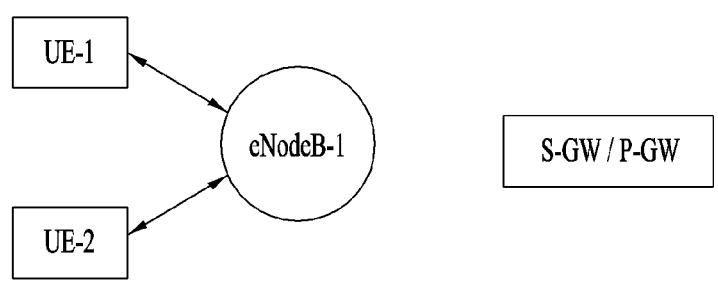
FIG. 9 illustrates a ProSe-based communication path between two UEs through an eNode B.

FIG. 9 illustrates a locally routed data path through eNode B between two UEs based on ProSe. This communication path through eNode B does not pass through a core network (i.e., EPC) managed by an operator.

Figure 10:
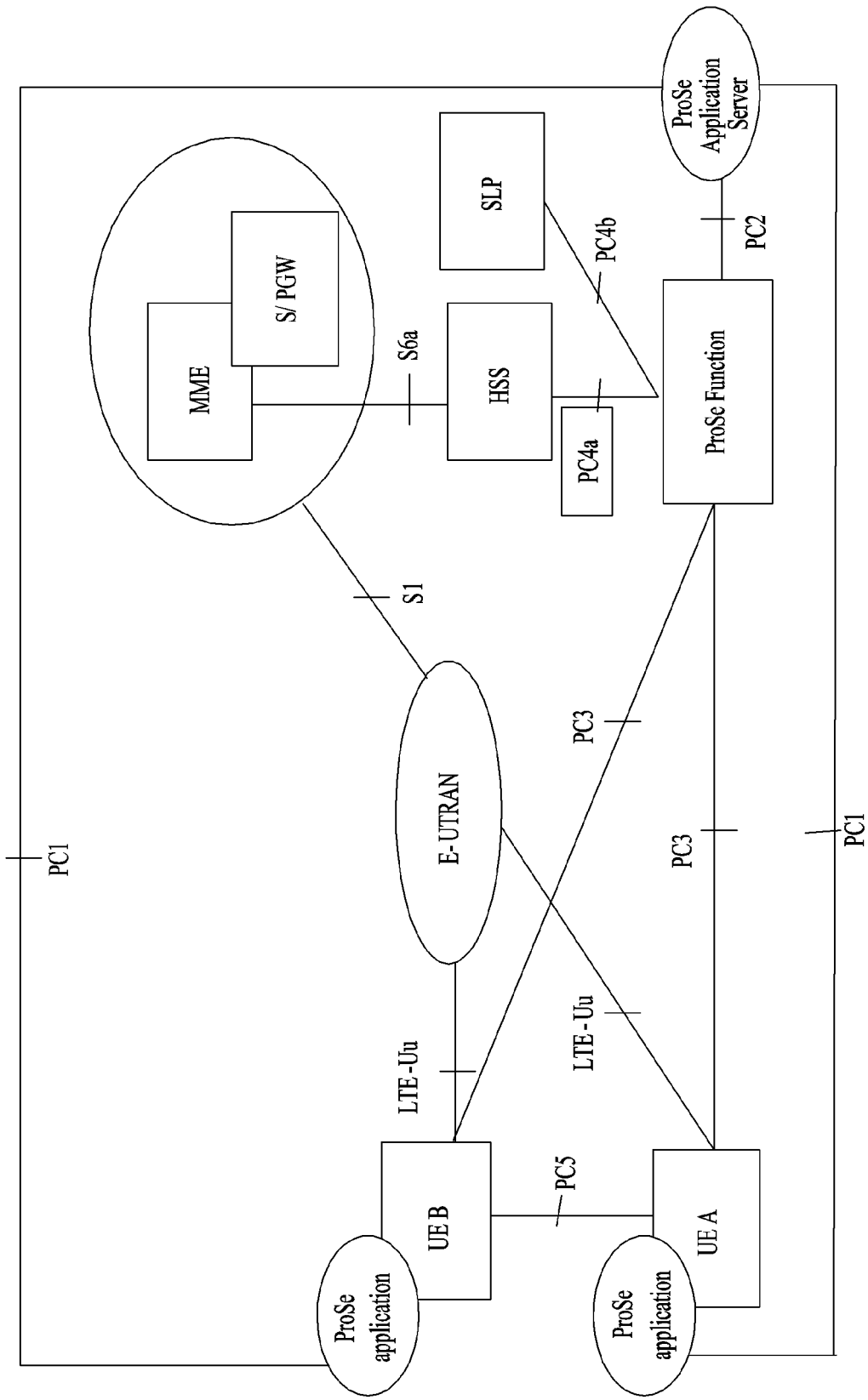
FIG. 10 illustrates a non-roaming reference architecture.

A non-roaming reference architecture is shown in FIG. 10. In the structure of FIG. 10, the EPC may determine proximity of two UEs and perform an EPC-level ProSe discovery procedure to notify the UE of the determined result. For this EPC-level ProSe discovery, a ProSe Function serves to determine proximity of two UEs and notify the UE of the determined result.

The ProSe function may retrieve and store ProSe associated subscriber data and/or ProSe associated subscriber data from HSS, and perform authentication and configuration for EPC level ProSe discovery and EPC sub WLAN direct discovery communication. Also, the ProSe function may be operated as a location service client that enables EPC level discovery, and may provide the UE of information for assisting WLAN direct discovery and communication. The ProSe function handles EPC ProSe User IDs and Application Layer User ID, and exchanges a signal with a third party application server for application registration identifier mapping. For transmission of a proximity request, proximity alerts and location report, the ProSe function exchanges a signal with a ProSe function of other PLMNs. In addition, the ProSe function provides various parameters required for ProSe discovery and ProSe communication. Details of the ProSe function are based on 3GPP TS 23.303.

Figure 11:
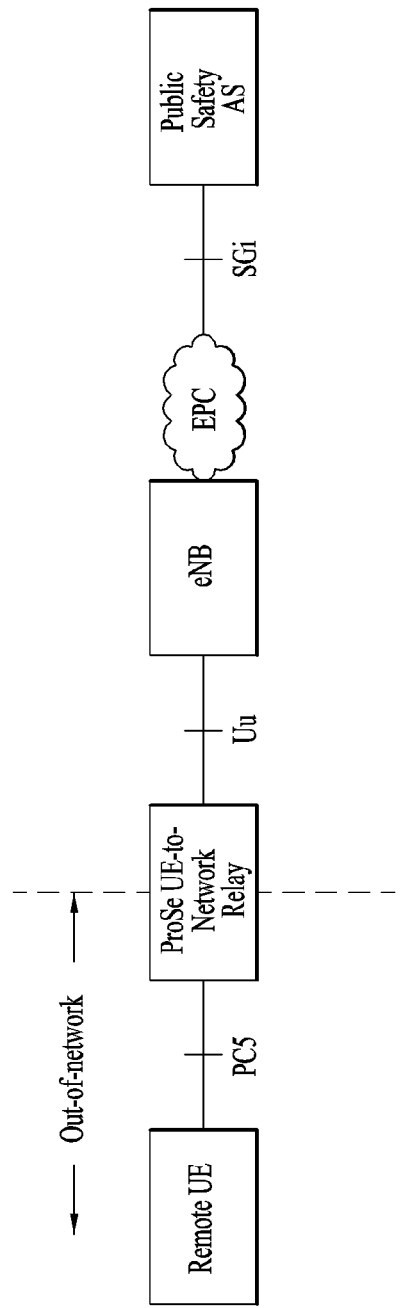
FIG. 11 is a diagram illustrating communication through a Prose UE-to-Network Relay.
Figure 12:
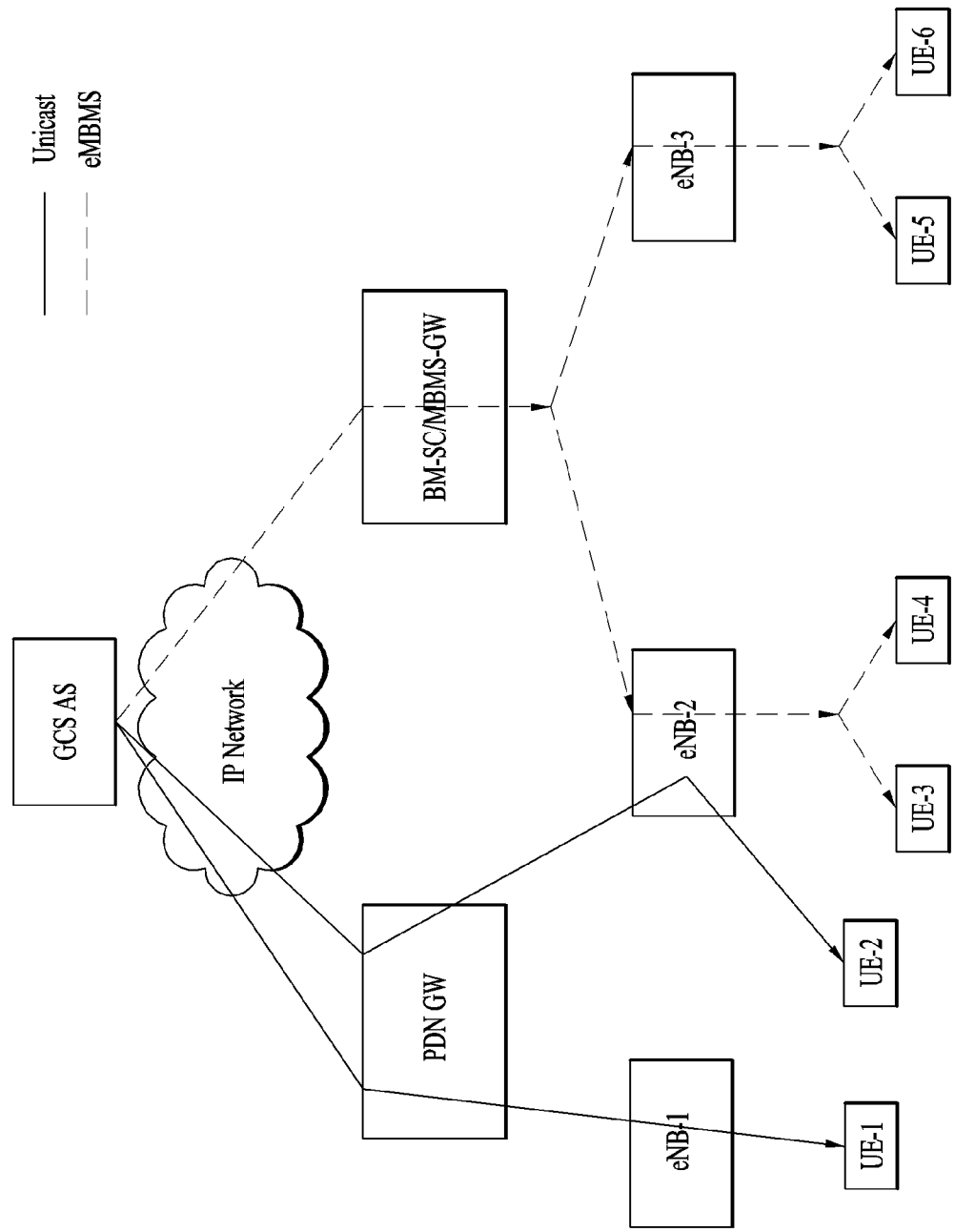
FIG. 12 is a diagram illustrating media traffic of group communication.

FIG. 11 illustrates communication through a ProSe UE-to-Network Relay. When a remote UE has connectivity to an EPC through a UE-to-network relay, the remote UE can communicate with an application server (AS) or participate in group communication. FIG. 12 shows an example in which a remote UE participate in group communication. UE-1 to UE-6 which are UEs belonging to the same group in FIG. 12 may receive downlink traffic through unicast or MBMS for specific media that configure group communication. As a result, although not in E-UTRAN coverage, the remote UE may transmit media traffic to other group members (that is, generate uplink traffic) by joining group communication through the UE-to-Network Relay or receive media traffic transmitted from other group members. In FIG. 12, a GCS AS (Group Communication Service Application Server) may serve to i) exchange GC1 signalling, ii) receive uplink data from a unicast UE, iii) transfer data to all UEs, which belong to a group, by using Unicast/MBMS delivery, iv) transmit application level session information through Rx interface to a PCRF, and v) support a service continuity procedure for a UE which is switched between Unicast Delivery and MBMS Delivery. The GCS AS, Public Safety AS, and GCSE AS (Group Communication Service Enabler Application Server) may be interpreted to refer to the same meaning and include AS that controls/manages communication joined by a plurality of UEs. Details of group communication is based on TS 23.468.

Figure 13:
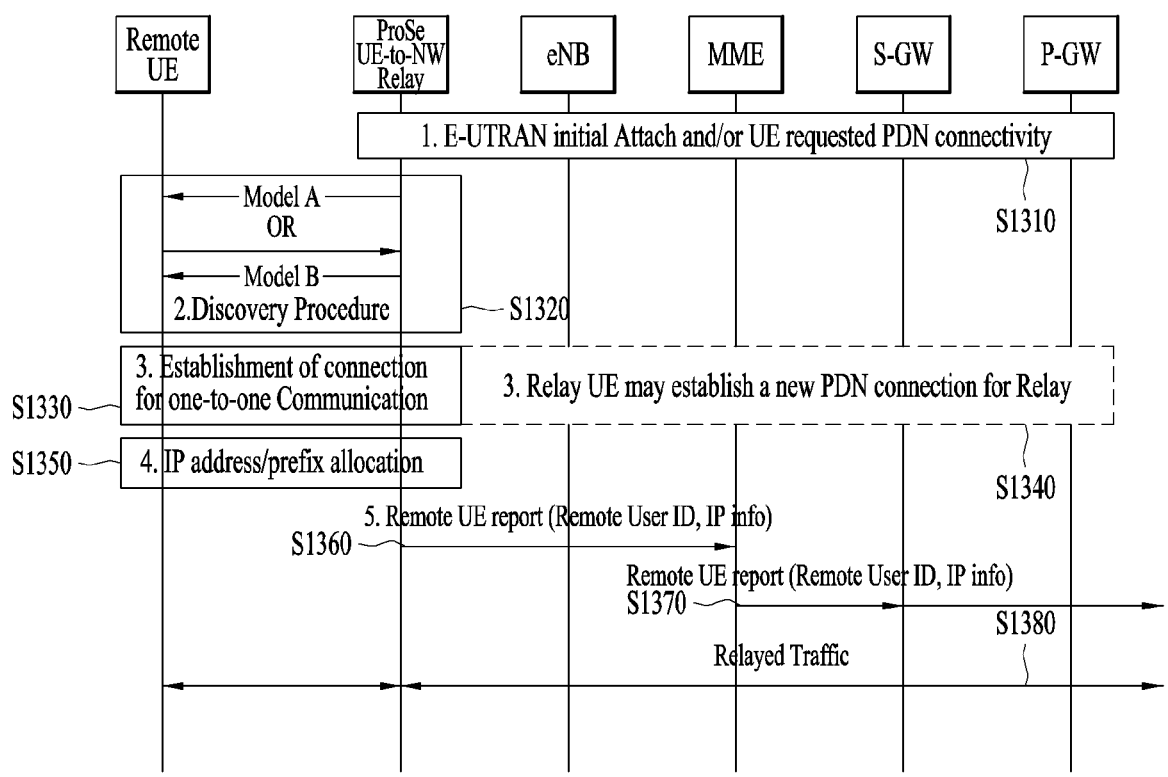
FIG. 13 is a diagram illustrating a procedure in which a remote UE performs direct communication through a UE-to-network relay.

FIG. 13 illustrates a procedure in which a remote UE performs direct communication through a UE-to-network relay. A UE capable of operating as a ProSe UE-to-network relay may establish a PDN connection to provide relay traffic to the remote UE by accessing the network. The PDN connection supporting the UE-to-network relay is used only to provide the relay traffic to the remote UE.

First, a relay UE establishes a PDN connection through initial access to an E-UTRAN [S1310]. In the case of IPv6, the relay UE obtains an IPv6 prefix using a prefix delegation function. Next, the relay UE performs a discovery procedure, which differs depending on either Model A or Model B, together with a relay UE [S1320]. The remote UE selects the relay UE discovered through the discovery procedure and then establishes one-to-one direct connection [S1330]. If there is no PDN connection associated with a relay UE ID or if an additional PDN connection for relay operation is required, the relay UE initiates a new PDN connection procedure [S1340].

Next, an IPv6 prefix or an IPv4 address is allocated to the remote UE [S1350], and then uplink/downlink relay operation is initiated. When the IPv6 prefix is allocated, an IPv6 stateless address auto-configuration procedure configured with router solicitation signaling from the remote UE to the relay UE and router advertisement signaling from the relay UE to the remote UE is initiated. On the other hand, when the IPv4 address is allocated, an IPv4 address allocation using DHCPv4 procedure configured with DHCPv4 discovery signaling (from the remote UE to the relay UE), DHCPv4 offer signaling (from the relay UE to the remote UE), DHCPv4 request signaling (from the remote UE to the relay UE), and DHCPv4 ACK signaling (from the relay UE to the remote UE) is initiated.

Thereafter, the relay UE performs a Remote UE Report procedure for informing an MME that the relay UE is connected to the remote UE [S1360]. The MME performs a Remote UE Report Notification procedure to inform an SGW and a PGW that the new remote UE is connected

[S1370]. Then, the remote UE performs communication with the network through the relay UE [S1380]. Details of the direct connection generation procedure could be found in TS 23.303.

Meanwhile, UE-to-network relay discovery may use such a discovery scheme as Model A and Model B. (Refer to TR 23.713 v1.4.0, 6.1 paragraph (Solution for Direct Discovery (public safety use)) and TS 23.303, 5.3.1.2 paragraph (ProSe Direct Discovery Models).

Model A ("I am here") discovery defines roles of ProSe-enabled UEs as an announcing UE and a monitoring UE. The announcing UE corresponds to a UE configured to announce information capable of being used by a UE located at a proximity distance where discovery is allowed. The monitoring UE corresponds to a UE configured to receive information form the announcing UE. The announcing UE broadcasts a discovery message in a predetermined discovery interval and the monitoring UE reads and processes the discovery message.

Model B ("who is there?"/"are you there?") discovery defines a discoverer UE and a discoveree UE as roles of UEs. The discoverer UE requests interesting information for discovering and the discoveree UE corresponds to a UE configured to receive a discovery request and make a respond using information related to the discovery request. When a UE-to-network relay discovery operation and a UE-to-UE relay discovery operation are performed, parameters/information included in a direct discovery message (i.e., a PC5-D message) are described in the following.

In the Model A discovery, parameters included in a PC5 discovery message (PC-5D message) for announcing UE-to-network relay discovery are shown in Table 2 in the following.

TABLE 2

| Information Element | Type/Reference | Presence | Length (bits) |
|---|---|---|---|
| Message Type (NOTE) | Message Type | M | 8 |
| ProSe Relay UE ID | Binary | M | 24 |
| Announcer Info | Binary | M | TBD |
| Relay Service Code | Binary | M | TBD |
| Radio Layer Information | Binary | M | TBD |

(NOTE):
The Discovery Type is set to "Restricted discovery", the Content Type is set to "UE-to-Network Relay Discovery Announcement or UE-to-Network Relay Discovery Response" and the Discovery Model is set to "Model A".

In the Model B discovery, parameters included in a PC5 discovery message for soliciting UE-to-network relay discovery are shown in Table 3 in the following.

TABLE 3

| Information Element | Type/Reference | Presence | Length (bits) |
|---|---|---|---|
| Message Type (NOTE) | Message Type | M | 8 |
| Discoverer Info | Binary | M | TBD |
| Relay Service Code | Binary | M | TBD |

(NOTE):
The Discovery Type is set to "Restricted discovery", the Content Type is set to "UE-to-Network Relay Discovery Solicitation" and the Discovery Model is set to "Model B".

In the Model B discovery, parameters included in a PC5 discovery message for responding to UE-to-network relay discovery are shown in Table 4 in the following.

TABLE 4

| Information Element | Type/Reference | Presence | Length (bits) |
|---|---|---|---|
| Message Type (NOTE) | Message Type | M | 8 |
| ProSe Relay UE ID | Binary | M | 24 |
| Discoveree Info | Binary | M | TBD |
| Relay Service Code | Binary | M | TBD |
| Radio Layer Information | Binary | M | TBD |

(NOTE):
The Discovery Type is set to "Restricted discovery", the Content Type is set to "UE-to-Network Relay Discovery Announcement or UE-to-Network Relay Discovery Response" and the Discovery Model is set to "Model B".

In the Model A discovery, parameters included in a PC5 discovery message for announcing to group member discovery are shown in Table 5 in the following.

TABLE 5

| Information Element | Type/Reference | Presence | Length (bits) |
|---|---|---|---|
| Message Type (NOTE) | Message Type | M | 8 |
| ProSe UE ID | Binary | M | 24 |
| Announcer Info | Binary | M | TBD |
| Layer-2 Discovery Group ID | Binary | M | TBD |

(NOTE):
The Discovery Type is set to "Restricted discovery", the Content Type is set to "Group Member Discovery Announcement or Group Member Discovery Response" and the Discovery Model is set to "Model A".

In the Model B discovery, parameters included in a PC5 discovery message for soliciting group member discovery are shown in Table 6 in the following.

TABLE 6

| Information Element | Type/Reference | Presence | Length (bits) |
|---|---|---|---|
| Message Type (NOTE) | Message Type | M | 8 |
| Discoverer Info | Binary | M | TBD |
| Layer-2 Discovery Group ID | Binary | M | TBD |
| Target Info | Binary | M | TBD |

(NOTE):
The Discovery Type is set to "Restricted discovery", the Content Type is set to "Group Member Discovery Solicitation" and the Discovery Model is set to "Model B".

In the Model B discovery, parameters included in a PC5 discovery message for responding to group member discovery are shown in Table 7 in the following.

TABLE 7

| Information Element | Type/Reference | Presence | Length (bits) |
|---|---|---|---|
| Message Type (NOTE) | Message Type | M | 8 |
| Prose UE ID | Binary | M | 24 |
| Discoveree Info | Binary | M | TBD |
| Layer-2 Discovery Group ID | Binary | M | TBD |

(NOTE):
The Discovery Type is set to "Restricted discovery", the Content Type is set to "Group Member Discovery Announcement or Group Member Discovery Response" and the Discovery Model is set to "Model B".

Figures 14, 15:
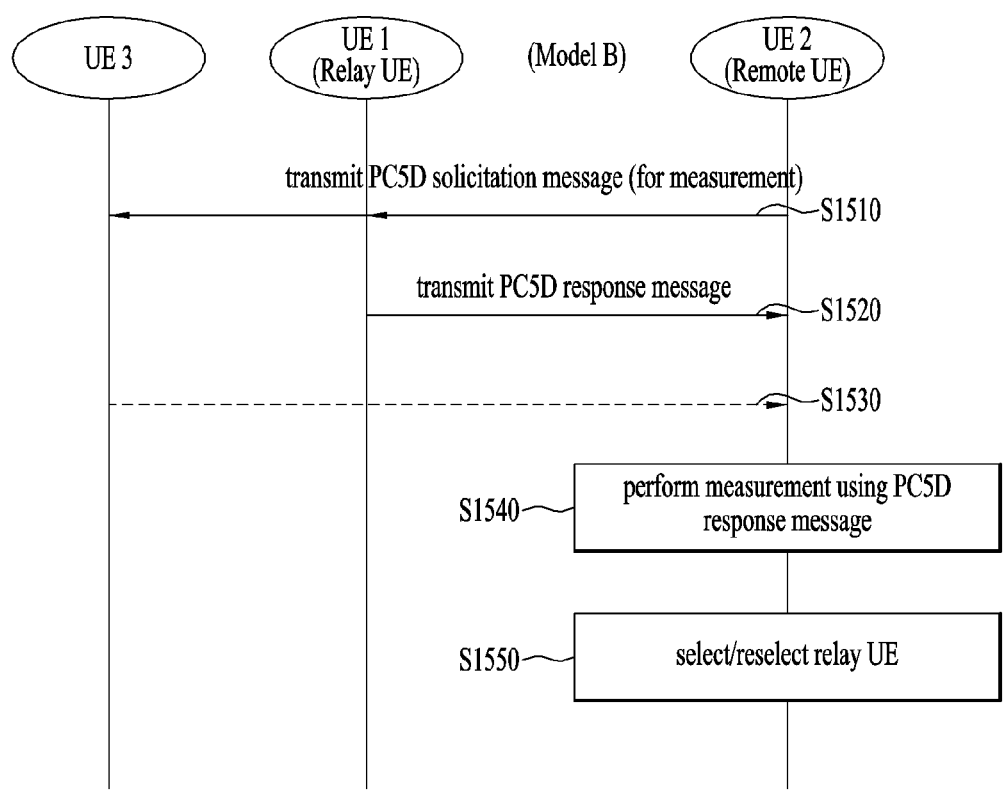
FIG. 14 illustrates an example of a message type field included in a PC5 discovery message.
FIGS. 15 to 17 are flowcharts illustrating a proposed embodiment.

Meanwhile, the aforementioned PC5-D messages are distinguished from each other according to a using method and a type of the messages. Each of the PC5-D messages shown in Table 2 to Table 7 includes a message type field indicating a type of a message. FIG. 14 illustrates an example of implementing the message type field included in the PC %-D message. Table 8 shows a configuration of the message type field shown in FIG. 14 in detail.

TABLE 8

| Discovery type value (octet 1) | | |
| --- | --- | --- |
| Bit 8 | Bit 7 | parameter |
| 0 | 0 | Reserved |
| 0 | 1 | Open Discovery |
| 1 | 0 | Restricted Discovery |
| 1 | 1 | Reserved |

| Content type value (octet 1) | | | | |
| --- | --- | --- | --- | --- |
| Bit 6 | Bit 5 | Bit 4 | Bit 3 | parameter |
| 0 | 0 | 0 | 0 | announce/response |
| 0 | 0 | 0 | 1 | query |
| 0 | 0 | 1 | 0 | application-controlled extension enabled |
| 0 | 0 | 1 | 1 | reserved |
| 0 | 1 | 0 | 0 | UE-to-Network Relay Discovery Announcement or UE-to-Network Relay Discovery Response |
| 0 | 1 | 0 | 1 | UE-to-Network Relay Discovery Solicitation |
| 0 | 1 | 1 | 0 | Group Member Discovery Announcement or Group Member Discovery Response |
| 0 | 1 | 1 | 1 | Group Member Discovery Solicitation |
| 1 | 0 | 0 | 0 | Reserved |
| 1 | 0 | 0 | 1 | Reserved |
| 1 | 0 | 1 | 0 | Reserved |
| 1 | 0 | 1 | 1 | Reserved |
| 1 | 1 | 0 | 0 | Reserved |
| 1 | 1 | 0 | 1 | Reserved |
| 1 | 1 | 1 | 0 | Reserved |
| 1 | 1 | 1 | 1 | Reserved |

| Discovery model value (octet 1) | | |
| --- | --- | --- |
| Bit 2 | Bit 1 | parameter |
| 0 | 0 | Reserved |
| 0 | 1 | Model A |
| 1 | 0 | Model B |
| 1 | 1 | Reserved |

Referring to Table 8, a content type field value '0100' indicates a case that a PC5-D message is used for an announcing operation in Model A and a discoveree operation in Model B in a UE-to-network relay discovery procedure. A content type field value '0110' indicates a case that a PC5-D message is used for an announcing operation in Model A and a discoveree operation in Model B in a group member discovery procedure.

In the following, each of the parameters included in the PC5-D message shown in Table 2 to Table 7 is explained in detail.

ProSe UE ID: A ProSe UE ID parameter is used to indicate an ID of a ProSe UE and is configured by a bit string of a length of 24 bits.

ProSe relay UE ID: A ProSe relay UE ID parameter is used to indicate an ID of a ProSe relay UE and is configured by a bit string of a length of 24 bits.

User Info ID: A user info ID parameter corresponds to an ID of user info defined in TS 23.303.

Relay service code: A relay service code parameter corresponds to a parameter for identifying a service of a public safety application provided by a UE-to-network relay.

Radio layer information: A radio layer information parameter includes information provided by a lower layer to enable a remote UE to select a UE-to-network relay.

Target Info: A target info parameter is used to provide information on a target discovery (user or group).

Layer-2 Discovery Group ID: A layer-2 discovery group ID parameter includes a link layer identifier of a discovery group to which a UE belongs thereto.

3. Proposed ProSe Communication Method 1

As mentioned in the foregoing description, a PC5 discovery (PC5-D or PC5D) message can be used in various ways in ProSe communication environment. Meanwhile, a PC5D message is used for performing measurement in the ProSe communication environment. In particular, when a remote UE and a relay UE perform direct communication in a manner of being connected, the remote UE periodically measures signal strength of a direct link established between the remote UE and the relay UE. This is because, if channel status with the relay UE becomes poor, it is necessary for the remote UE to reselect the relay UE.

Or, when a remote UE, which has not established a direct link with a different UE, searches for a new relay UE, measurement can be performed using a PC5D message. In particular, the remote UE performs measurement using the PC5D message to select a relay UE of a sufficiently good channel state.

In particular, when measurement is performed using a PC5D message to select/reselect a relay UE, the measurement can be performed using a DMRS (demodulation reference signal) of a PSDCH (physical sidelink discovery channel). In ProSe communication, it is necessary to measure not only signal strength of a relay UE having an established connection but also signal strength of a relay UE having no established connection. Hence, when signal strength of a message is measured, since it is necessary for a remote UE to know a service providing relay UE from which the message is transmitted, a PC5D message including a relay service code parameter is used for a measurement procedure.

Meanwhile, according to the Model B discovery scheme, if a remote UE transmits a PC5D request message (solicitation message) including a relay service code parameter to a relay UE, the relay UE checks a relay service code of the received PC5D message. If the checked relay service code is identical to a value set to the relay UE, the relay UE transmits a PC5D response message to the remote UE. In particular, in the Model B discovery scheme, when the remote UE transmits the PC5D request message (solicitation message) to the relay UE to measure link quality with the relay UE of which a link is currently established with the remote UE, if a relay service code included in the PC5D request message is matched with a value set to the relay UE in advance, the relay UE transmits a PC5D response message to the remote UE. In the abovementioned procedure, it is necessary for the relay UE (or, a serving relay UE), which has established a link with the remote UE, to independently transmit a response in response to a request of each remote UE. The PC5D request message transmitted by the remote UE can be forwarded to a different UE as well as the serving relay UE. In this case, the relay service code included in the PC5D request message of the remote UE can be matched with a value set to a third party relay UE. In particular, since the third party relay UE makes a response in response to the PC5D request message, signaling overhead may occur. The signaling overhead leads to the waste of a PC5 radio resource.

In the following, when a PC5D message is transmitted, a method of reducing an unnecessary operation and resource waste is proposed by determining a purpose of the PC5D message. The purpose of the PC5D message can be classified into a discovery purpose corresponding to an original purpose and a different purpose (including a measurement purpose). When the purpose of the PC5D message is classified according to a proposed embodiment, if the PC5D message of the discovery purpose is received, a remote/relay UE operates according to a legacy purpose. If a PC5D message of a different purpose rather than the discovery purpose is received, the remote/relay UE operates according to the new purpose. Specifically, if a relay UE, which has established a connection with a remote UE, receives a PC5D message of a measuring purpose, the relay UE transmits a PC5D message to the remote UE in response to the PC5D message of the measuring purpose. If the remote UE receives the PC5D message, the remote UE measures quality of a ProSe link currently established with the relay UE. However, when a relay UE does not establish a connection with any remote UE, if the relay UE receives a PC5D message of a measuring purpose, the relay UE discards the PC5D message without using the PC5D message for a discovery purpose or a measuring purpose.

Meanwhile, a method of determining a purpose of a PC5D message can be mainly divided into 3 methods. A first method is to add indication indicating a purpose of a PC5D message to the PC5D message, a second method is to modify a PC5D message, and a third method is to define a new PC5D message. Each method can be independently applied or can be complexly applied together with a different method.

The first method (a method of adding an indicator indicating a purpose to a legacy PC5D message) is explained in detail. Specifically, it may add an indicator of 1 bit to indicate a purpose of a PC5D message. If the PC5D message is used for a discovery purpose, the indicator is set to '0'. If the PC5D message is used for a different purpose rather than the discovery purpose, the indicator can be set to '1'. (A value of the indicator can be set in an opposite way.)

According to the proposed method, the PC5D message mentioned earlier in Tables 2 to 4 can be implemented as Tables 9 to 11. Table 9 shows a PC5D announcement message, Table 10 shows a PC5D solicitation message, and Table 11 shows a PC5D response message.

TABLE 9

| Information Element | Type/Reference | Presence | Length (bits) |
|---|---|---|---|
| Message Type (NOTE) | Message Type | M | 8 |
| ProSe Relay UE ID | Binary | M | 24 |
| Announcer Info | Binary | M | TBD |
| Relay Service Code | Binary | M | TBD |
| Radio Layer Information | Binary | M | TBD |
| Discovery Indication | Binary | M | 1 |

(NOTE):
The Discovery Type is set to "Restricted discovery", the Content Type is set to "UE-to-Network Relay Discovery Announcement or UE-to-Network Relay Discovery Response" and the Discovery Model is set to "Model A".

TABLE 10

| Information Element | Type/Reference | Presence | Length (bits) |
|---|---|---|---|
| Message Type (NOTE) | Message Type | M | 8 |
| Discoverer Info | Binary | M | TBD |
| Relay Service Code | Binary | M | TBD |
| Discovery Indication | Binary | M | 1 |

(NOTE):
The Discovery Type is set to "Restricted discovery", the Content Type is set to "UE-to-Network Relay Discovery Solicitation" and the Discovery Model is set to "Model B".

TABLE 11

| Information Element | Type/Reference | Presence | Length (bits) |
|---|---|---|---|
| Message Type (NOTE) | Message Type | M | 8 |
| ProSe Relay UE ID | Binary | M | 24 |
| Discoveree Info | Binary | M | TBD |
| Relay Service Code | Binary | M | TBD |
| Radio Layer Information | Binary | M | TBD |
| Discovery Indication | Binary | M | 1 |

(NOTE):
The Discovery Type is set to "Restricted discovery", the Content Type is set to "UE-to-Network Relay Discovery Announcement or UE-to-Network Relay Discovery Response" and the Discovery Model is set to "Model B".

In Tables 9 to 11, 'Discovery Indication' parameter is used to indicate a purpose of a PC5D message. A value ('0' or '1') of the parameter can indicate a 'discovery purpose' or a 'purpose rather than discovery purpose'.

The second method (a method of modifying a legacy PC5D message) is explained in detail. According to a proposed embodiment, it may determine a 'purpose rather than discovery purpose' by modifying a message type field included in a legacy PC5D message. FIG. 14 illustrates a configuration of a message type field mentioned earlier in Table 8 in detail. It may be able to indicate 'No discovery' by modifying at least one selected from the group consisting of a discovery type field, a content type field, and a discovery model field among message type fields shown in FIG. 18. If a PC5D message is used for a discovery purpose, the PC5D message can be transmitted according to a legacy art without modifying a corresponding field.

Specifically, for example, if 'No discovery' is indicated to the discovery type field included in the message type field, the message type field mentioned earlier in Table 8 can be configure as Table 12 in the following. In Table 12, if a discovery type value indicates '11', it indicates that a PC5D message is not used for a discovery purpose.

TABLE 12

| Discovery type value (octet 1) | | |
|---|---|---|
| Bit 8 | Bit 7 | parameter |
| 0 | 0 | Reserved |
| 0 | 1 | Open Discovery |
| 1 | 0 | Restricted Discovery |
| 1 | 1 | No Discovery |

| Content type value (octet 1) | | | | |
|---|---|---|---|---|
| Bit 6 | Bit 5 | Bit 4 | Bit 3 | parameter |
| 0 | 0 | 0 | 0 | announce/response |
| 0 | 0 | 0 | 1 | query |
| 0 | 0 | 1 | 0 | application-controlled extension enabled |
| 0 | 0 | 1 | 1 | reserved |
| 0 | 1 | 0 | 0 | UE-to-Network Relay Discovery Announcement or UE-to-Network Relay Discovery Response |
| 0 | 1 | 0 | 1 | UE-to-Network Relay Discovery Solicitation |
| 0 | 1 | 1 | 0 | Group Member Discovery Announcement or Group Member Discovery Response |
| 0 | 1 | 1 | 1 | Group Member Discovery Solicitation |
| 1 | 0 | 0 | 0 | Reserved |
| 1 | 0 | 0 | 1 | Reserved |
| 1 | 0 | 1 | 0 | Reserved |
| 1 | 0 | 1 | 1 | Reserved |
| 1 | 1 | 0 | 0 | Reserved |
| 1 | 1 | 0 | 1 | Reserved |

TABLE 12-continued

| | | | | |
|---|---|---|---|---|
| 1 | 1 | 1 | 0 | Reserved |
| 1 | 1 | 1 | 1 | Reserved |

| Discovery model value (octet 1) | | |
|---|---|---|
| Bit 2 | Bit 1 | parameter |
| 0 | 0 | Reserved |
| 0 | 1 | Model A |
| 1 | 0 | Model B |
| 1 | 1 | Reserved |

As a different example, if 'No discovery' is indicated to the content type field included in the message type field, the message type field mentioned earlier in Table 8 can be configure as Table 13 in the following. In Table 13, if a content type value indicates '1000', it indicates that a PC5D message is not used for a discovery purpose.

TABLE 13

| Discovery type value (octet 1) | | |
|---|---|---|
| Bit 8 | Bit 7 | parameter |
| 0 | 0 | Reserved |
| 0 | 1 | Open Discovery |
| 1 | 0 | Restricted Discovery |
| 1 | 1 | Reserved |

| Content type value (octet 1) | | | | |
|---|---|---|---|---|
| Bit 6 | Bit 5 | Bit 4 | Bit 3 | parameter |
| 0 | 0 | 0 | 0 | announce/response |
| 0 | 0 | 0 | 1 | query |
| 0 | 0 | 1 | 0 | application-controlled extension enabled |
| 0 | 0 | 1 | 1 | reserved |
| 0 | 1 | 0 | 0 | UE-to-Network Relay Discovery Announcement or UE-to-Network Relay Discovery Response |
| 0 | 1 | 0 | 1 | UE-to-Network Relay Discovery Solicitation |
| 0 | 1 | 1 | 0 | Group Member Discovery Announcement or Group Member Discovery Response |
| 0 | 1 | 1 | 1 | Group Member Discovery Solicitation |
| 1 | 0 | 0 | 0 | No Discovery |
| 1 | 0 | 0 | 1 | Reserved |
| 1 | 0 | 1 | 0 | Reserved |
| 1 | 0 | 1 | 1 | Reserved |
| 1 | 1 | 0 | 0 | Reserved |
| 1 | 1 | 0 | 1 | Reserved |
| 1 | 1 | 1 | 0 | Reserved |
| 1 | 1 | 1 | 1 | Reserved |

| Discovery model value (octet 1) | | |
|---|---|---|
| Bit 2 | Bit 1 | parameter |
| 0 | 0 | Reserved |
| 0 | 1 | Model A |
| 1 | 0 | Model B |
| 1 | 1 | Reserved |

As a further different example, if 'No discovery' is indicated to the discovery model field included in the message type field, the message type field mentioned earlier in Table 8 can be configure as Table 14 in the following. In Table 14, if a discovery model value indicates '11', it indicates that a PC5D message is not used for a discovery purpose.

TABLE 14

| Discovery type value (octet 1) | | |
|---|---|---|
| Bit 8 | Bit 7 | parameter |
| 0 | 0 | Reserved |
| 0 | 1 | Open Discovery |
| 1 | 0 | Restricted Discovery |
| 1 | 1 | Reserved |

| Content type value (octet 1) | | | | |
|---|---|---|---|---|
| Bit 6 | Bit 5 | Bit 4 | Bit 3 | parameter |
| 0 | 0 | 0 | 0 | announce/response |
| 0 | 0 | 0 | 1 | query |
| 0 | 0 | 1 | 0 | application-controlled extension enabled |
| 0 | 0 | 1 | 1 | reserved |
| 0 | 1 | 0 | 0 | UE-to-Network Relay Discovery Announcement or UE-to-Network Relay Discovery Response |
| 0 | 1 | 0 | 1 | UE-to-Network Relay Discovery Solicitation |
| 0 | 1 | 1 | 0 | Group Member Discovery Announcement or Group Member Discovery Response |
| 0 | 1 | 1 | 1 | Group Member Discovery Solicitation |
| 1 | 0 | 0 | 0 | Reserved |
| 1 | 0 | 0 | 1 | Reserved |
| 1 | 0 | 1 | 0 | Reserved |
| 1 | 0 | 1 | 1 | Reserved |
| 1 | 1 | 0 | 0 | Reserved |
| 1 | 1 | 0 | 1 | Reserved |
| 1 | 1 | 1 | 0 | Reserved |
| 1 | 1 | 1 | 1 | Reserved |

| Discovery model value (octet 1) | | |
|---|---|---|
| Bit 2 | Bit 1 | parameter |
| 0 | 0 | Reserved |
| 0 | 1 | Model A |
| 1 | 0 | Model B |
| 1 | 1 | No Discovery |

In the second method, it may consider a different scheme for indicating a PC5D purpose by modifying a PC5D message. It may be able to display a purpose of a PC5D message by modifying a different parameter (or, a field) except a message type parameter (or, field) in the PC5D message. A modified PC5D message can be implemented in a form of excluding or adding partial information (or, a value, a parameter, a field) included in the original PC5D message.

An embodiment of excluding partial information from the original PC5D message is explained first. It may be able to display a purpose of the PC5D message by selectively including a part of fields of the original PC5D message (i.e., by optionally adding a field). For example, if a PC5D message is used for a measuring purpose, it may be able to transmit the PC5D message while a specific field of the PC5D message is deleted. If a PC5D message is used for a discovery purpose, it may be able to transmit the PC5D message by including a specific field in the PC5D message.

An optionally included field may vary according to each of the PC5D messages mentioned earlier in Tables 2 to 4. First of all, at least one selected from the group consisting of 'Relay Service Code', 'Announcer Info', and 'ProSe Relay UE ID' can be excluded from a PC5D announcement message according to a purpose of a PC5D message. In this case, at least one of 'Announcer Info' and 'ProSe Relay UE ID' should be included in the PC5D announcement message without being excluded. For example, if the PC5D message is not used for a discovery purpose, the 'Relay Service Code' field can be excluded from the PC5D message only.

Or, if the PC5D message is not used for a discovery purpose, the 'Relay Service Code' and the 'Announcer Info' fields can be excluded from the PC5D message. Table 15 in the following shows an embodiment that the 'Relay Service Code' field is optionally included/excluded in/from the PC5D announcement message mentioned earlier in Table 2.

TABLE 15

| Information Element | Type/Reference | Presence | Length (bits) |
| --- | --- | --- | --- |
| Message Type (NOTE) | Message Type | M | 8 |
| ProSe Relay UE ID | Binary | M | 24 |
| Announcer Info | Binary | M | TBD |
| Relay Service Code | Binary | O | TBD |
| Radio Layer Information | Binary | M | TBD |

(NOTE):
The Discovery Type is set to "Restricted discovery", the Content Type is set to "UE-to-Network Relay Discovery Announcement or UE-to-Network Relay Discovery Response" and the Discovery Model is set to "Model A".

Subsequently, 'Relay Service Code' or 'Discoverer Info' field can be excluded from a PC5D solicitation message. Table 16 in the following shows an embodiment of optionally including/excluding the 'Relay Service Code' field in/form the PC5D solicitation message.

TABLE 16

| Information Element | Type/Reference | Presence | Length (bits) |
| --- | --- | --- | --- |
| Message Type (NOTE) | Message Type | M | 8 |
| Discoverer Info | Binary | M | TBD |
| Relay Service Code | Binary | O | TBD |

(NOTE):
The Discovery Type is set to "Restricted discovery", the Content Type is set to "UE-to-Network Relay Discovery Solicitation" and the Discovery Model is set to "Model B".

Meanwhile, as shown in Table 16, unlike an embodiment of excluding a partial field from a PC5D solicitation message, it may also consider a scheme of adding a partial field to the message. In particular, if 'Relay UE ID' field is added to the PC5D solicitation message, identification information of a relay UE transmitting the PC5D solicitation message can be included. If the 'Relay UE ID' field is included, it can be comprehended as a PC5D message is used for not a discovery purpose but a measuring purpose. This embodiment is shown in Table 17 in the following.

TABLE 17

| Information Element | Type/Reference | Presence | Length (bits) |
| --- | --- | --- | --- |
| Message Type (NOTE) | Message Type | M | 8 |
| Discoverer Info | Binary | O | TBD |
| Relay Service Code | Binary | O | TBD |
| ProSe Relay UE ID | Binary | O | 24 |

(NOTE):
The Discovery Type is set to "Restricted discovery", the Content Type is set to "UE-to-Network Relay Discovery Solicitation" and the Discovery Model is set to "Model B".

Lastly, at least one selected from the group consisting of 'ProSe Relay UE ID', 'Relay Service Code', and 'Discoveree Info' field can be excluded from a PC5D response message according to a purpose of the PC5D message. In this case, at least one of 'Announcer Info' and 'ProSe Relay UE ID field should be remained in the PC5D response message. For example, the 'Relay Service Code' field can be excluded from the PC5D response message only. Or, the 'Relay Service Code' field and the 'Discoveree Info' field can be excluded from the PC5D response message.

Table 18 and Table 19 illustrate an embodiment (Table 18) of optionally including/excluding 'Relay Service Code' field in/from the PC5D response message of Table 4 and an embodiment (Table 19) of optionally including/excluding 'Relay Service Code' field and 'Discoveree Info' field in/from the PC5D response message, respectively.

TABLE 18

| Information Element | Type/Reference | Presence | Length (bits) |
| --- | --- | --- | --- |
| Message Type (NOTE) | Message Type | M | 8 |
| ProSe Relay UE ID | Binary | M | 24 |
| Discoveree Info | Binary | M | TBD |
| Relay Service Code | Binary | O | TBD |
| Radio Layer Information | Binary | M | TBD |

(NOTE):
The Discovery Type is set to "Restricted discovery", the Content Type is set to "UE-to-Network Relay Discovery Announcement or UE-to-Network Relay Discovery Response" and the Discovery Model is set to "Model B".

TABLE 19

| Information Element | Type/Reference | Presence | Length (bits) |
| --- | --- | --- | --- |
| Message Type (NOTE) | Message Type | M | 8 |
| ProSe Relay UE ID | Binary | M | 24 |
| Discoveree Info | Binary | O | TBD |
| Relay Service Code | Binary | O | TBD |
| Radio Layer Information | Binary | M | TBD |

(NOTE):
The Discovery Type is set to "Restricted discovery", the Content Type is set to "UE-to-Network Relay Discovery Announcement or UE-to-Network Relay Discovery Response" and the Discovery Model is set to "Model B".

Subsequently, the third method (a method of defining a new PC5D message) is explained. According to the third method, a legacy PC5D message is used for a discovery purpose only and a newly defined discovery message can be used for a different purpose rather than the discovery purpose. Partial information (or, a field, a parameter, a value) included in the legacy PC5D message can be excluded from the newly defined discovery message.

Specifically, the newly defined discovery message can be implemented in a manner that at least one selected from the group consisting of 'Relay Service Code', 'Announcer Info', and 'ProSe Relay UE ID' field is excluded from a PC5D announcement message. In this case, at least one of the 'Announcer Info' and the 'ProSe Relay UE ID' field should be remained in the newly defined discovery message. Or, the newly defined discovery message can be implemented by excluding 'Relay Service Code' or 'Discoverer Info' field from the PC5D solicitation message. Or, the newly defined discovery message can be implemented by excluding at least one selected from the group consisting of 'Relay Service Code', 'Discoveree Info', and 'ProSe Relay UE ID' from the PC5D response message. In this case, at least one of the 'Announcer Info' and the 'ProSe Relay UE ID' field should be remained in the newly defined discovery message except the 'Relay Service Code' field.

The newly defined discovery message can be implemented according to one of Tables 20 to 22.

TABLE 20

| Information Element | Type/Reference | Presence | Length (bits) |
| --- | --- | --- | --- |
| Message Type (NOTE) | Message Type | M | 8 |
| ProSe Relay UE ID | Binary | M | 24 |
| Announcer Info | Binary | M | TBD |
| Radio Layer Information | Binary | M | TBD |

TABLE 21

| Information Element | Type/Reference | Presence | Length (bits) |
|---|---|---|---|
| Message Type (NOTE) | Message Type | M | 8 |
| Announcer Info | Binary | M | TBD |
| Radio Layer Information | Binary | M | TBD |

In Table 21, 'Announcer Info' field may correspond to 'Discoverer Info' field or 'Discoveree Info' field of a legacy PC5D message.

TABLE 22

| Information Element | Type/Reference | Presence | Length (bits) |
|---|---|---|---|
| Message Type (NOTE) | Message Type | M | 8 |
| ProSe Relay UE ID | Binary | M | 24 |
| Radio Layer Information | Binary | M | TBD |

FIG. 15 is a flowchart for one embodiment of the present invention. As mentioned in the foregoing description, a legacy PC5D message is utilized not only for a discovery purpose but also for a different purpose. In this case, in the Model B discovery environment, a PC5D request (solicitation) message, which is transmitted by a remote UE (UE 2) for a measuring purpose, is forwarded not only to a relay UE (UE 1) connected with the remote UE (UE 2) but also to a relay UE (UE 3) not connected with the remote UE. As a result, relay UEs (UE 3) not connected with the remote UE (UE 2) transmit a PC5D response message to the remote UE. In particular, a message flooding phenomenon may occur.

In the embodiment shown in FIG. 15, a method of including a relay UE ID in a PC5D solicitation message transmitted by a remote UE (UE 2) is proposed to solve a problem in the Model B discovery environment.

In FIG. 15, a PC5D solicitation message transmitted in the step S1510 includes the 'ProSe Relay UE ID' parameter (or, field, value) mentioned earlier in Table 17. The 'ProSe Relay UE ID' corresponds to an identifier of a relay UE (UE 1) connected with the remote UE (UE 2) and is received from the UE 1 in a discovery procedure between the UE 1 and the UE 2. Meanwhile, the 'ProSe Relay UE ID' included in the PC5D solicitation message in the step S1510 is completely distinguished from the same parameter which is not included in a legacy PC5D solicitation message. In particular, when the UE 2 transmits the PC5D message for the purpose of discovery, the UE 2 transmits the PC5D message without including the 'ProSe Relay UE ID' field in the PC5D message. On the other hand, when the UE 2 transmits the PC5D message for the purpose of measurement in addition to the discovery purpose, the 'ProSe Relay UE ID' parameter is included in the PC5D message.

If the UE 1 receives a PC5D message in which a UE ID of the UE 1 is included, the UE 1 is able to know that the PC5D message transmitted by the UE 2 corresponds to a PC5D message for a measuring purpose, the UE 1 transmits a PC5D response message to the UE 2 to enable the UE 2 perform measurement [S1520]. On the contrary, since the 'ProSe Relay UE ID', which is included in the PC5D message transmitted by the UE 2, is not an ID of a UE 3, the UE 3 does not transmit any response signal to the UE 2 [1530]. In other word, a relay UE transmits a PC5D response message to a remote UE only when 'ProSe Relay UE ID' of the relay UE is included in a PC5D solicitation message. In particular, according to the proposed embodiment, since an unnecessary PC5D response message is not transceived with the UE 3 which is not connected with the UE 2, it may be able to prevent signaling overhead and the waste of a PC % radio resource.

Meanwhile, the UE 2 performs measurement using the PC5D response message received from the UE 1 [S1540]. In particular, the UE 2 measures radio link quality with the UE 1 using a DMRS of PSDCH to determine whether to maintain the connection with the UE 1 according to a measurement result. For example, if the connection with the UE 1 is sufficient, the UE 2 maintains the connection with the UE 1. If channel environment with the UE 1 is not good, the UE 2 performs 'relay UE selection/reselection' procedure to find out a new relay UE [S1550].

Irrespective of FIG. 15, a method of reducing a transmission count/frequency of a PC5D solicitation message, which is transmitted to measure radio link quality with a currently connected relay UE in the Model B discovery environment, is proposed. When a remote UE establishes a connection with a relay UE, the remote UE can configure a prescribed timer T41xx (xx corresponds to a random value) to transmit a PC5D message, which is transmitted to periodically measure quality of a radio link with the relay UE. The timer T41xx is initiated in a manner of being configured by an initial value and the initial value of the timer can be set to a UE in advance. Or, the initial value can be configured by a network. Or, a serving relay UE can forward the initial value of the timer to a remote UE via a PC5D message or a PC5S message.

If the remote UE receives a PC5D response message from the serving relay UE while the timer T41xx operates, the remote UE stops the timer, resets the timer, and starts the timer again. And, the remote UE uses the received PC5D message for a measuring purpose. In other word, the remote UE recognizes the PC5D response message, which is received while the timer T41xx is operating, as a PC5D message of a measuring purpose.

Meanwhile, if the remote UE fails to receive a PC5D message from the serving relay UE until the timer T41 expires, the remote UE transmits a PC5D solicitation message of a measuring purpose to the serving relay UE. If a PC5D response message is received in response to the PC5D solicitation message, the remote UE resets the timer and starts the timer again.

In summary, if the remote UE configures a prescribed timer, the remote UE can utilize a PC5D response message, which is received while the timer operates, for a measuring purpose. If the timer expires, the remote UE directly transmits a PC5D solicitation message of a measuring purpose to the relay UE to enable the relay UE to perform measurement.

Meanwhile, in the aforementioned embodiment, in order to identify whether or not the PC5D solicitation message is successfully transmitted to the relay UE, the remote UE can configure an another timer T41ab (ab corresponds to a random number) while transmitting the PC5D solicitation message to the relay UE. If a PC5D response message is not received until the timer T41ab expires, the remote UE can retransmit the PC5D solicitation message to the relay UE.

In this case, if the remote UE uses the PC5D response message transmitted by the relay UE only for a measuring purpose, transmission of a PC5D request message may increase for periodical measurement. In order to improve this, if the remote UE utilizes a different PC5D message received from the relay UE for a measuring purpose, it may be able to reduce a transmission count/frequency of a PC5D request message which is transmitted to periodically measure radio link quality with the connected relay UE. In particular, when a PC5D message is receive while a timer is operating, the PC5D message corresponds to a message transmitted by the serving relay UE to a third party remote UE. For example, the PC5D message may correspond to one selected from the group consisting of a PC5D announcement message, a PC5D response message, a PC5D relay discovery additional information message, and a new PC5D message. If the remote UE receive one of the abovementioned PC5D messages from a currently connected relay UE, the remote UE stops the T41xx timer and may be able to measure radio link quality using the received PC5D message.

4. Proposed ProSe Communication Method 2

Irrespective of the aforementioned method, in the aspect of a relay UE, although the relay UE is already connected with one or more remote UEs, it is necessary for the relay UE to continuously transmit a PC5D message. In particular, although the relay UE does not want to establish a connection with a different UE anymore except the currently connected remote UE, it is necessary for the relay UE to periodically or aperiodically transmit a PC5D message to perform measurement. As a result, a third party remote UE (i.e., a remote UE, which has not established a connection with the relay UE) receives the PC5D message transmitted by the relay UE and makes a response to the PC5D message. Hence, unnecessary signaling overhead may occur.

If the third party remote UE, which has not established a connection with the relay UE, makes a response in response to the PC5D message, it indicates that the third party remote UE transmits a direct communication request message to the relay UE to establish a connection with the relay UE. In this case, if the relay UE is in a state of failing to secure sufficient resources capable of supporting an additional remote UE, unlike the intention of the relay UE, the third party remote UE requests a direct connection to the relay UE. As a result, unnecessary signaling overhead occurs. In other word, when a remote UE establishes a connection with the relay UE, since the remote UE utilizes a PC5D message of the relay UE for a measuring purpose, there is no problem. On the other hand, a third party remote UE regards the relay UE as a UE capable of being connected with the third party remote UE. Hence, the third party remote UE initiates to establish a connection with the relay UE.

Meanwhile, since the relay UE does not have sufficient resources capable of supporting an additional remote UE, the relay UE transmits a direct communication reject message to the third party remote UE together with a reason #4 'lack of resources for proposed link'. Or, the relay UE releases a connection with a part of currently connected remote UEs and may transmit a direct communication release message to the released remote UE together with a reason #2 'direct communication with the peer UE is no longer allowed'. If the relay UE transmits a PC5D message for measurement, the abovementioned operation can be repeated. Since both of the aforementioned operations of the relay UE are not preferable in ProSe communication and cause unnecessary signaling overhead, it is necessary to prevent the operations.

According to the proposed embodiment, when the relay UE transmits a PC5D message, the relay UE can indicate information on whether or not resources capable of providing a service to an additional remote UE are sufficient. The information can be included in the PC5D message in a form of an indicator. For example, the information can be implemented in a form of a resource status indicator.

Having received the PC5D message including the information (e.g., a resource status indicator) on the resources of the relay UE, remote UEs use the information in the course of selecting/reselecting a relay. The remote UE preferentially selects a relay UE having sufficient resources to be provided to the remote UE. As a result, unnecessary PC5 signaling overhead for a direct connection configuration can be reduced.

The abovementioned embodiment can be applied to both the Model A discovery and the Model B discovery. In the following, a detail procedure is explained with reference to FIG. 16 and FIG. 17.

Figure 16:
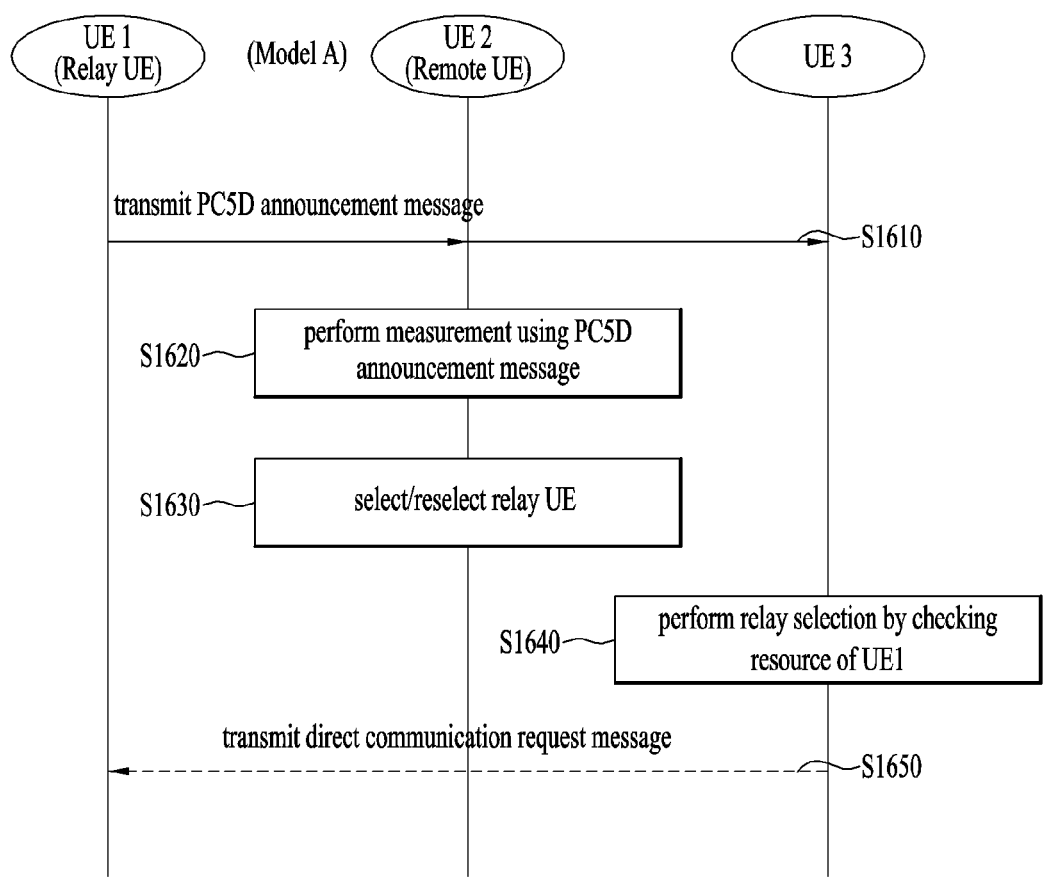

First of all, in the Model A environment shown in FIG. 16, a relay UE (UE 1) transmits a PC5D announcement message [S1610]. The PC5D announcement message is transmitted not only to a remote UE (UE 2), which has established a connection with the UE 1, but also to a third party remote UE (UE 3) which has not established a connection with the UE 1.

According to the proposed embodiment, in the step S1610, the UE 1 shall set (RSI) Resource Status Indicator bit of the Status Indicator parameter to indicate whether or not the UE 1 has resources available to provide a connectivity service for additional remote UEs (or, ProSe-enabled public safety UEs). In particular, the UE 1 transmits the PC5D announcement message in a manner of including the RSI in the PC5D announcement message. In this case, the RSI included in the PC5D announcement message may indicate that the UE 1 has resources not sufficient enough for supporting an additional remote UE.

Having received the PC5D announcement message, the UE 2 measures a connection with the UE 1 using the PC5D message [S1620]. The UE 2 may be able to maintain the connection with the UE 1 or select a new relay UE based on a measurement result [S1630]. On the other hand, the UE 3 corresponding to the third party remote UE is able to know whether or not the UE 1 occupies resources capable of supporting the UE 3 using the RSI included in the PC5D announcement message transmitted by the UE 1. The UE 3 selects a relay UE in consideration of the resources occupied by the UE 1 [S1640]. In particular, if the UE 3 checks that the UE 1 does not have sufficient resources based on the RSI, the UE 3 can exclude the UE 1 in a relay selection procedure. By doing so, it is able to avoid an unnecessary signaling procedure. If the UE 3 checks that the UE 1 has sufficient resources capable of supporting the UE 3, the UE 3 transmits a direct connection request message to the UE 1 [S1650].

Figure 17:
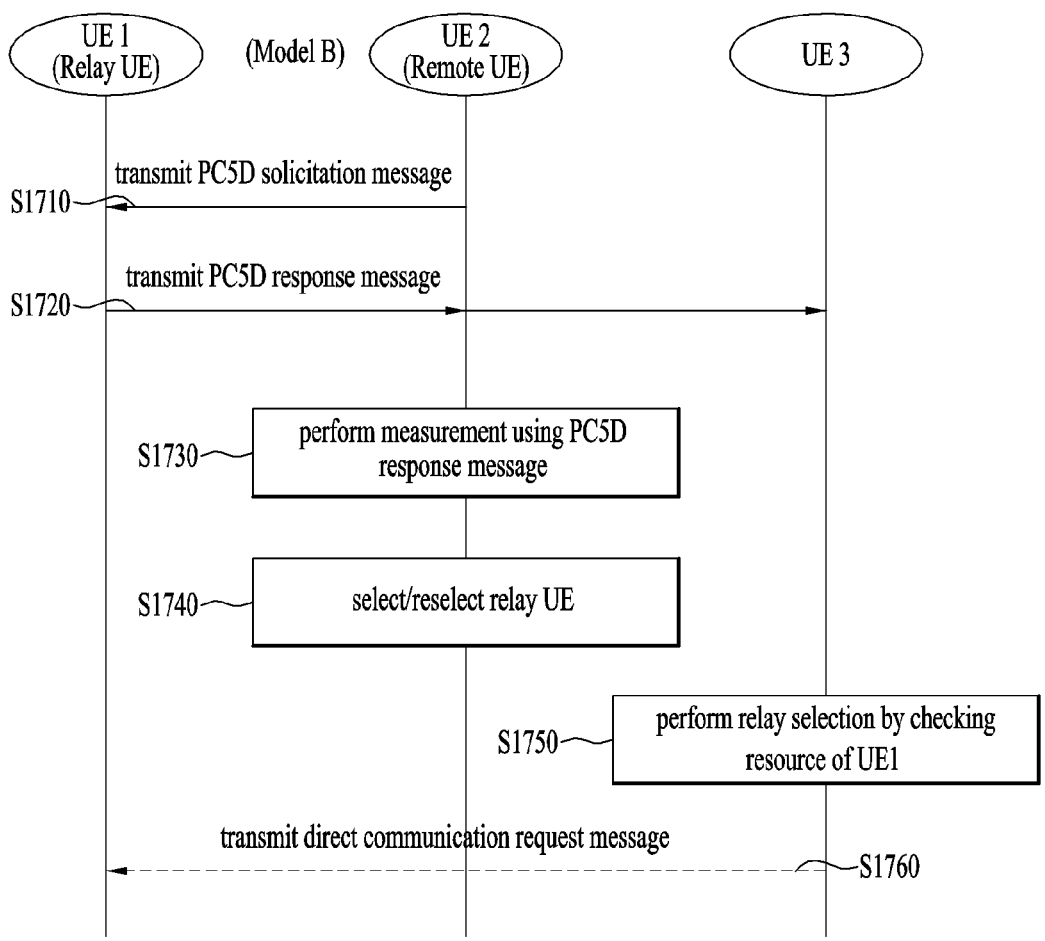

Subsequently, FIG. 17 is explained. In the Model B environment shown in FIG. 17, if a remote UE (UE 2) establishes a connection with a relay UE (UE 1), the remote UE (UE 2) transmits a PC5D solicitation message to the UE 1 [S1710]. The UE 1 transmits a PC5D response message to the UE 2 in response to the PC5D solicitation message [S1720]. In this case, the UE 1 shall set the Resource Status Indicator bit of the Status Indicator parameter to indicate whether or not the UE has resources available to provide a connectivity service for additional remote UEs (or, ProSe-enabled public safety UEs). In particular, the UE 1 transmits the PC5D response message in a manner of including the RSI in the PC5D response message. In this case, the RSI included in the PC5D announcement message may indicate that the UE 1 has resources not sufficient enough for supporting an additional remote UE.

Having received the PC5D response message, the UE 2 measures a connection with the UE 1 using the PC5D message [S1730]. The UE 2 may be able to maintain the connection with the UE 1 or select a new relay UE based on a measurement result [S1740]. On the other hand, the UE 3 corresponding to the third party remote UE is able to know whether or not the UE 1 occupies resources capable of supporting the UE 3 using the RSI included in the PC5D response message transmitted by the UE 1. The UE 3 selects a relay UE in consideration of the resources occupied by the UE 1 [S1750]. Similar to the case of FIG. 16, if the resources of the UE 1 are not sufficient, a procedure of transmitting a direct connection request message transmitted by the UE 3 is omitted. If the resources of the UE 1 are sufficient, the UE 3 transmits the direct connection request message to the UE 1 [S1760].

In summary, if the remote UE receives the RSI included in the PC5D announcement/response message, the remote UE selects a relay UE in consideration of the RSI bit value. (The UE may take the value of the Resource Status Indicator bit of the Status Indicator parameter of the PC5_DISCOVERY message for UE-to-Network Relay Discovery Announcement or PC5_DISCOVERY message for UE-to-Network Relay Discovery Response into account when deciding which ProSe UE-to-network relay to select.)

The PC5D announcement message and the PC5D response message according to the proposed embodiment can be configured as Table 23 and Table 24, respectively. According to Table 23 and Table 24, each of the PC5D messages can be configured to further include a field for indicating an RSI value.

TABLE 23

| Information Element | Type/Reference | Presence | Length (bits) |
| --- | --- | --- | --- |
| Message Type (NOTE) | Message Type | M | 8 |
| ProSe Relay UE ID | Binary | M | 24 |
| Announcer Info | Binary | M | 48 |
| Relay Service Code | Binary | M | 24 |
| Status Indicator | Binary | M | 8 |
| Spare | Binary | M | 80 |
| MIC | Binary | M | 32 |
| UTC-based Counter LSB | Binary | M | 8 |

(NOTE):
The Discovery Type is set to "Restricted discovery", the Content Type is set to "UE-to-Network Relay Discovery Announcement or UE-to-Network Relay Discovery Response" and the Discovery Model is set to "Model A".

TABLE 24

| Information Element | Type/Reference | Presence | Length (bits) |
| --- | --- | --- | --- |
| Message Type (NOTE) | Message Type | M | 8 |
| ProSe Relay UE ID | Binary | M | 24 |
| Discoveree Info | Binary | M | 48 |
| Relay Service Code | Binary | M | 24 |
| Status Indicator | Binary | M | 8 |
| Spare | Binary | M | 80 |
| MIC | Binary | M | 32 |
| UTC-based Counter LSB | Binary | M | 8 |

(NOTE):
The Discovery Type is set to "Restricted discovery", the Content Type is set to "UE-to-Network Relay Discovery Announcement or UE-to-Network Relay Discovery Response" and the Discovery Model is set to "Model B".

Figure 18:
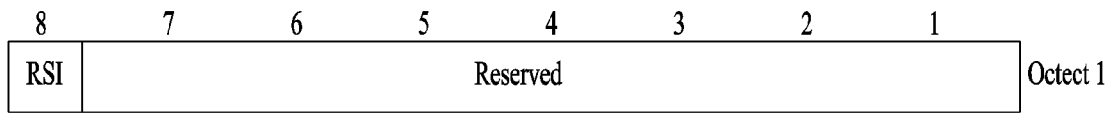
FIG. 18 illustrates a specific field of a PC5 discovery message according to a proposed embodiment.

FIG. 18 illustrates an example of configuring a field indicating an RSI value included in a PC5D message. As mentioned in the foregoing description, an RSI parameter is used to indicate a status of a relay UE. The RSI parameter indicates whether or not the relay UE occupies resources capable of providing a service to an additional remote UE. A bit value of the RSI parameter can be configured as Table 25 in the following.

TABLE 25

| | Status Indicator |
| --- | --- |
| Bit 8 | |
| 0 | UE does not occupy sufficient resources for supporting additional remote UE |
| 1 | UE occupies sufficient resources for supporting additional remote UE |
| Bit 1-7 | Reserved (coded as zero) |

Meanwhile, although it is explained as the embodiment mentioned earlier in FIG. 15 and the embodiment mentioned earlier in FIGS. 16 and 17 are independently applied, the two embodiments can be applied in a manner of being combined. In particular, in the Model B discovery scheme, 'Relay UE ID' parameter can be included in a PC5D request (solicitation) message transmitted by a remote UE and 'RSI' parameter can be included in a PC5D response message transmitted by a relay UE in response to the PC5D request (solicitation) message.

5. Device Configurations

Figure 19:
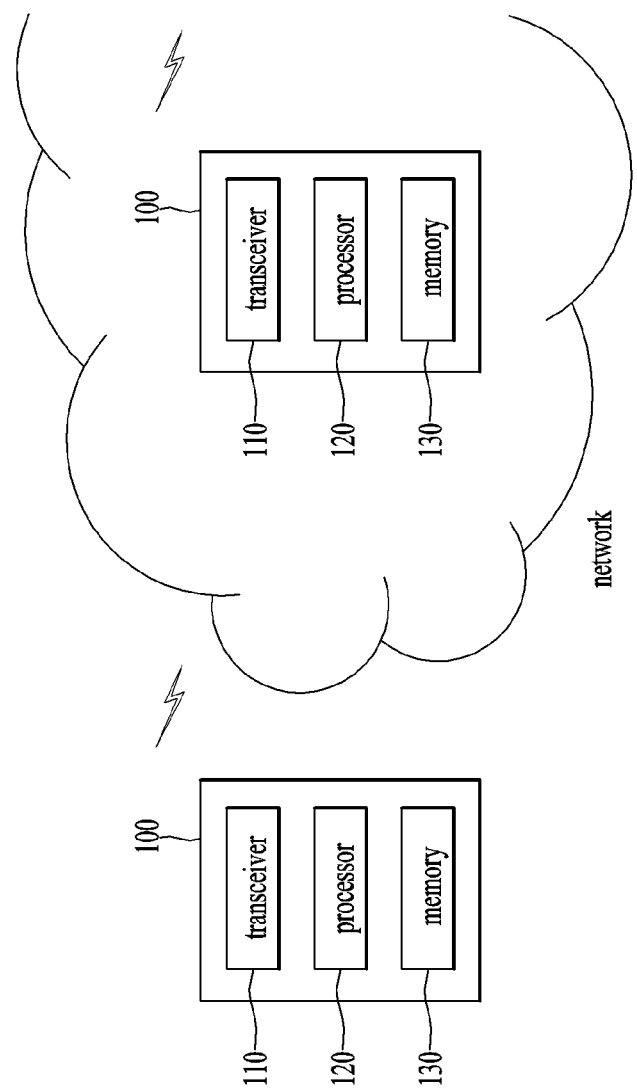
FIG. 19 is a diagram illustrating a configuration of a node device according to a proposed embodiment.

FIG. 19 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 19, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned communication method can be applied to not only the 3GPP system but also various wireless communication systems including an IEEE 802.16x system and IEEE 802.11x system. Further, the proposed method can also be applied to an mmWave communication system using super-high frequency band.

What is claimed is:

1. A method for performing a proximity service (ProSe) communication a ProSe-enabled UE in a wireless communication system, the method comprising:
   transmitting a PC5 discovery solicitation message including information used for indicating either a discovery purpose or a measurement purpose;
   receiving, from another UE, a PC5 discovery response message including a resource status indicator used for indicating whether or not the another UE has resources available to provide a connectivity service for additional ProSe-enabled UEs, in response to the PC5 discovery solicitation message; and
   determining a relay for establishing a direct link with the ProSe-enabled UE,
   wherein the relay is determined to be a UE other than the another UE based on the resource status indicator having a first value, and
   wherein the relay is determined to be the another UE based on the resource status indicator having a second value.

2. The method of claim 1, wherein the PC5 discovery solicitation message is transmitted based on a Model B discovery scheme.

3. A proximity service (ProSe)-enabled user equipment (UE), in a wireless communication system, comprising:
   a transmitter;
   a receiver; and
   a processor operatively connected with the transmitter and the receiver and configured to:
   control the transmitter to transmit a PC5 discovery solicitation message including information used for indicating either a discovery purpose or a measurement purpose;
   control the receiver to receive, from another UE, a PC5 discovery response message including a resource status indicator used for indicating whether or not the another UE has resources available to provide a connectivity service for additional ProSe-enabled UEs, in response to the PC5 discovery solicitation message; and
   determine a relay for establishing a connection for direct communication with the ProSe-enabled UE,
   wherein the relay is determined to be a UE other than the another UE based on the resource status indicator having a first value, and
   wherein the relay is determined to be the another UE based on the resource status indicator having a second value.

4. The first UE of claim 3, wherein based on a Model B discovery scheme, the PC5 discovery solicitation message is transmitted.

* * * * *